US006782274B1

(12) United States Patent
Park et al.

(10) Patent No.: US 6,782,274 B1
(45) Date of Patent: Aug. 24, 2004

(54) METHOD FOR TRANSMITTING RADIO RESOURCE CONTROL MESSAGE IN ASYNCHRONOUS MOBILE COMMUNICATION SYSTEM

(75) Inventors: Jae-Hong Park, Ichon-shi (KR);
Woon-Hee Hwang, Ichon-shi (KR);
Jeong-Hwa Ye, Ichon-shi (KR);
Shin-Hyun Yang, Ichon-shi (JP)

(73) Assignee: Hyundai Electronics Industries Co., Ltd. (KR)

( * ) Notice: Subject to any disclaimer, the term of this patent is extended or adjusted under 35 U.S.C. 154(b) by 519 days.

(21) Appl. No.: 09/694,840

(22) Filed: Oct. 23, 2000

(30) Foreign Application Priority Data

Oct. 21, 1999 (KR) ........................................ 1999-45883
Nov. 1, 1999 (KR) ........................................ 1999-47978

(51) Int. Cl.[7] .............................................. H04M 1/00
(52) U.S. Cl. ................. 455/552.1; 455/502; 455/553.1; 455/426.1
(58) Field of Search ........................... 455/552.1, 553.1, 455/426.1, 502, 503, 524, 435.1, 435.2, 436, 432.2, 13.2, 415, 412.2, 445, 525; 370/350, 503, 508, 518, 338, 340, 324, 328

(56) References Cited

U.S. PATENT DOCUMENTS 6,111,866 A * 8/2000 Kweon et al. ............... 370/335
6,397,065 B1 * 5/2002 Huusko et al. ............ 455/435.2
6,477,183 B1 * 11/2002 Yamamoto .................. 455/502
6,542,754 B1 * 4/2003 Sayers et al. ................ 455/502

FOREIGN PATENT DOCUMENTS

WO 9830042 7/1998
WO 9953668 10/1999

OTHER PUBLICATIONS

"Harmonized Global 3G Technical Framework for ITU IMT–2000 CDMA Proposal", *OHAG Technical Frame Work* Version May 28th, 1999.

* cited by examiner

*Primary Examiner*—Nay Maung
*Assistant Examiner*—John J Lee
(74) *Attorney, Agent, or Firm*—Baker Botts LLP

(57) ABSTRACT

A radio resource control (RRC) message is freely transmitted in an asynchronous mobile communication system regardless of an operating type of a core network. The method for transmitting a radio resource message from an asynchronous mobile station to an asynchronous radio network in an asynchronous mobile communication system, the method comprising the steps of: a) determining whether a core network is a synchronous core network or an asynchronous core network; b) if the core network is the synchronous core network, generating a RRC message having information related to the synchronous core network; and c) transmitting the RRC message to the asynchronous radio network.

27 Claims, 38 Drawing Sheets

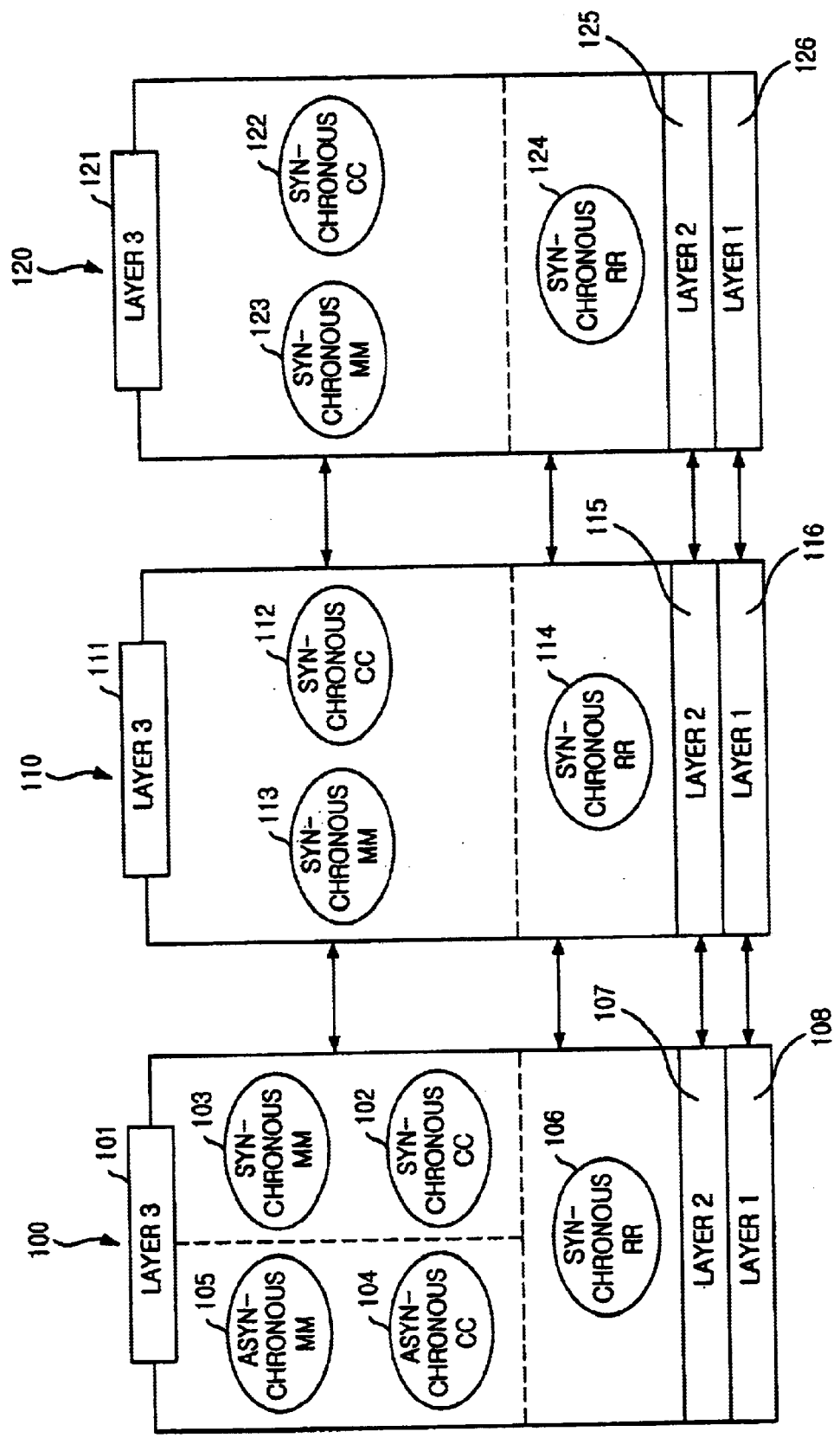

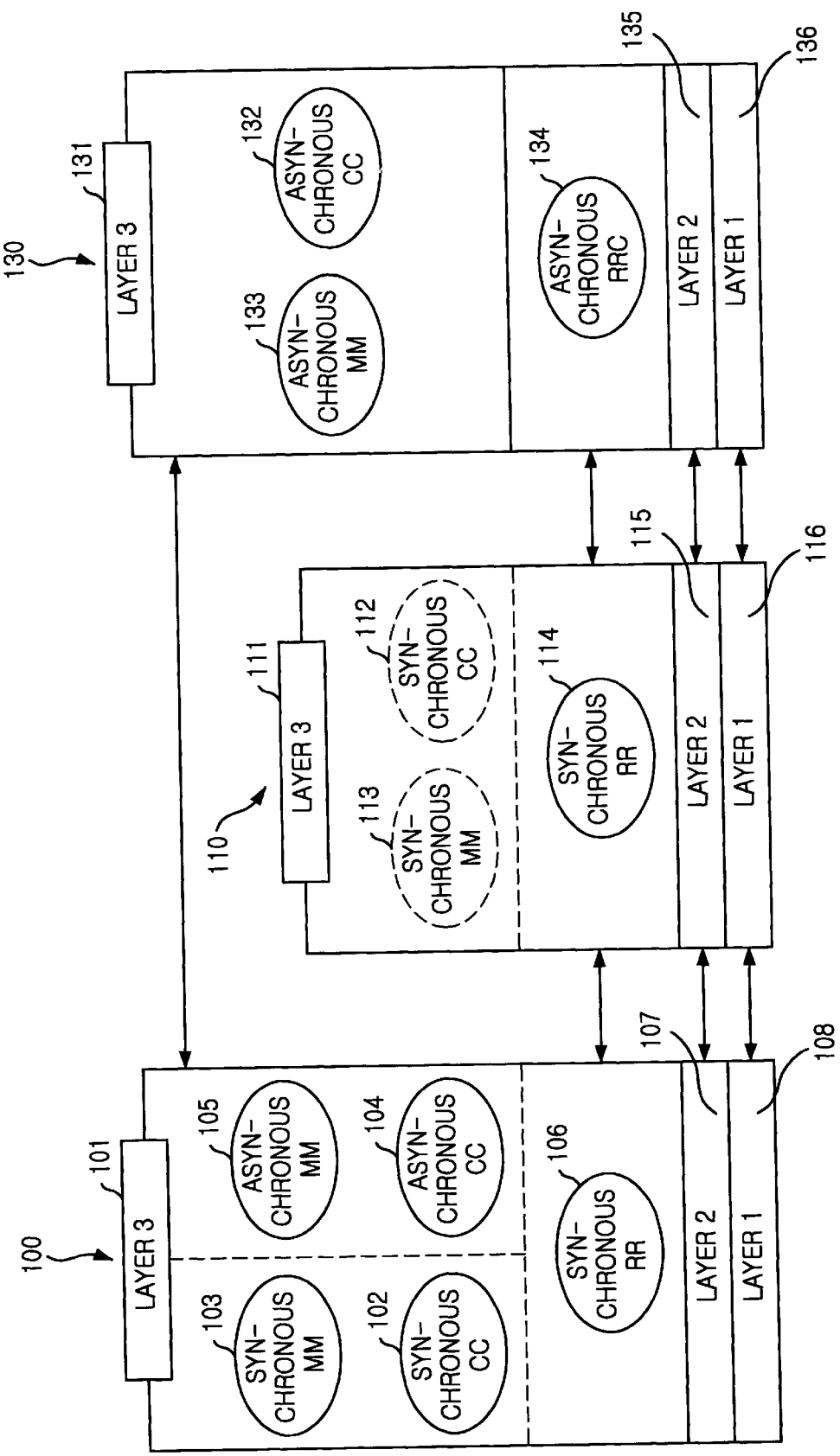

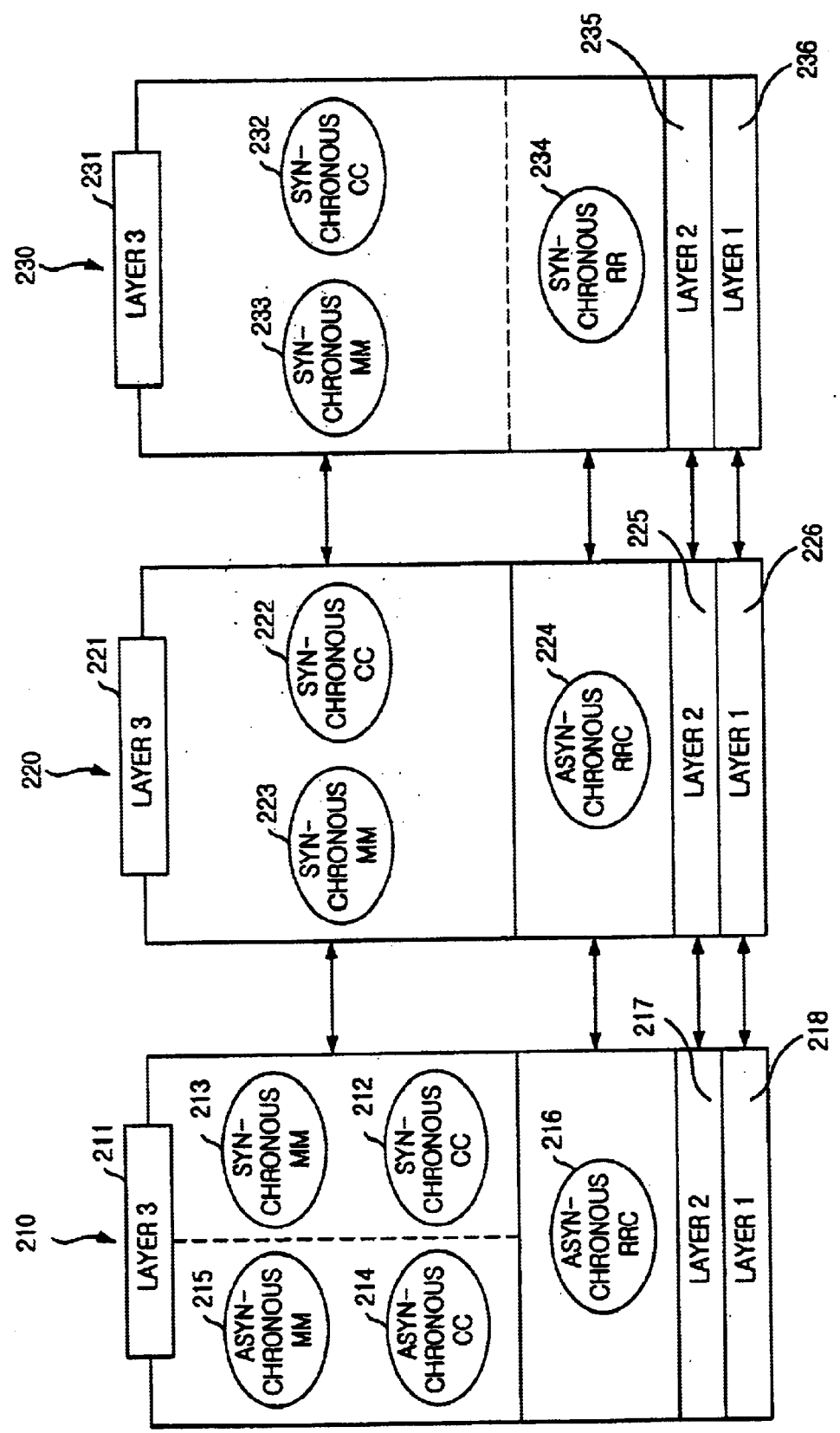

FIG. 7A

| Information Element | Presence | Range | IE type and reference | Semantics description |
|---|---|---|---|---|
| Message Type | M | | | |
| RTT | M | | | OPERATING TYPE OF CORE NETWORK |
| UE information elements | | | | |
| Initial UE identity | M | | | Choice UE id Type(Asynchronous) -IMSI / TMEI / P-TMSI / IMEI |
| Establishment cause | M | | | |
| Initial UE capability | O | | | Necessity is FFS |
| Measurement information elements | | | | |
| Measurement information | | 1 to <MeasRep Count> | | Send Measurement information for each measurement report in the message |
|    Measurement identity number | M | | | Refers to system information. Note 1 |
|    Measured results | M | | | |

FIG. 7B

| Information Element | Presence | Range | IE type and reference | Semantics description |
|---|---|---|---|---|
| Message Type | M | | | |
| RTT | M | | | OPERATING TYPE OF CORE NETWORK |
| UE information elements | | | | |
| Initial UE identity | M | | | Choice UE id Type (Synchronous) -IMSI / TMSI / ESN |
| Establishment cause | M | | | |
| Initial UE capability | O | | | Necessity is FFS |
| Measurement information elements | | | | |
| Measurement information | | 1 to <MeasRep Count> | | Send Measurement information for each measurement report in the message |
|    Measurement identity number | M | | | Refers to system information. Note 1 |
|    Measured results | M | | | |

FIG. 8A

| Information Element | Presence | Range | IE type and reference | Semantics description |
|---|---|---|---|---|
| Message Type | M | | | |
| RTT | M | | | OPERATING TYPE OF CORE NETWORK |
| UE information elements | | | | |
| U-RNTI | O | | | Only in case of SRNC relocation |
| C-RNTI | O | | | Only if assigned to a common transport channel |
| Activation time | O | | | |
| CN information elements | | | | |
| PLMN identity | O | | | (Note1) |
| CN related information | | 0 to <MaxNoCNdomains> | | CN related information to be provided for each CN domain |
|    CN domain identity | O | | | (Note1) |
|    NAS system info | O | | | (Note1) |
| RB information elements | | | | |
| | | 0 to <MaxRBcount> | | RB information is sent for each RB affected by this message |
| ... | | | | |
| TDD | | | | |
| Uplink Timing Advance | O | | | |

FIG. 8B

| Information Element | Presence | Range | IE type and reference | Semantics description |
|---|---|---|---|---|
| Message Type | M | | | |
| RTT | M | | | OPERATING TYPE OF CORE NETWORK |
| UE information elements | | | | |
| U-RNTI | O | | | Only in case of SRNC relocation |
| C-RNTI | O | | | Only if assigned to a common transport channel |
| Activation time | O | | | |
| CN information elements | | | | |
|    NID | O | | | |
|    SID | O | | | |
|    P_REV | O | | | |
|    MIN_P_REV | O | | | |
| RB information elements | | | | |
| | | 0 to <MaxRBcount> | | RB information is sent for each RB affected by this message |
| ... | | | | |
| TDD | | | | |
| Uplink Timing Advance | O | | | |

FIG. 9A

| Information Element | Presence | Range | IE type and reference | Semantics description |
|---|---|---|---|---|
| Message Type | M | | | |
| RTT | M | | | OPERATING TYPE OF CORE NETWORK |
| CN information elements | | | | |
|   CN domain identifier | M | | | |
|   NAS message | M | | | Includes the CN capability information |
| UE information elements | | | | |
| ⋮ | | | | |
| Other information elements | | | | |
|   Inter-system message | O | | | Includes inter-system classmark |
|     System Type | | | Enumerated (GSm, 1..15) | |
|     Message(s) | | 1.. < maxInterSysMessages > | Bitstring (1.. 512) | Formatted and coded according to specification for the indicated system type. |

FIG. 9B

| Information Element | Presence | Range | IE type and reference | Semantics description |
|---|---|---|---|---|
| Message Type | M | | | |
| RTT | M | | | OPERATING TYPE OF CORE NETWORK |
| CN information elements | | | | |
|   NID | M | | | |
|   SID | M | | | |
|   P_REV | M | | | |
|   MIN_P_REV | M | | | |
|   NAS message | M | | | Includes the CN capability information |
| UE information elements | | | | |
| ⋮ | | | | |
| Other information elements | | | | |
|   Inter-system message | O | | | Includes inter-system classmark |
|     System Type | | | Enumerated (GSM, 1..15, BSC) | |
|     Message(s) | | 1.. < maxInterSysMessages > | Bitstring (1.. 512) | Formatted and coded according to specification for the indicated system type. |

FIG. 10A

| Information Element/Group name | Need | Multi | Type and reference | Semantics description |
|---|---|---|---|---|
| Message Type | M | | | |
| RTT | M | | | OPERATING TYPE OF CORE NETWORK |
| UE information elements | | | | |
| Integrity check info | C | | | |
| CN information elements | | | | |
| CN Domain Identity | M | | | |
| NAS message | M | | | |

FIG. 10B

| Information Element/Group name | Need | Multi | Type and reference | Semantics description |
|---|---|---|---|---|
| Message Type | M | | | |
| RTT | M | | | OPERATING TYPE OF CORE NETWORK |
| UE information elements | | | | |
| Integrity check info | C | | | |
| CN Information elements | | | | |
| NID | M | | | |
| SID | M | | | |
| P_REV | M | | | |
| MIN_P_REV | M | | | |
| NAS message | M | | | |

FIG. 11A

| Information Element/Group name | Need | Multi | Type and reference | Semantics description |
|---|---|---|---|---|
| Message Type | M | | | |
| RTT | M | | | OPERATING TYPE OF CORE NETWORK |
| UE information elements | | | | |
| Integrity check info | C | | | |
| CN information elements | | | | |
| Service Descriptor | M | | | |
| Flow Identifier | M | | | |
| CN domain identity | M | | | |
| NAS message | M | | | |
| Measurement information elements | | | | |
| Measured results on RACH | O | | | |

FIG. 11B

| Information Element/Group name | Need | Multi | Type and reference | Semantics description |
|---|---|---|---|---|
| Message Type | M | | | |
| RTT | M | | | OPERATING TYPE OF CORE NETWORK |
| UE information elements | | | | |
| Integrity check info | C | | | |
| CN information elements | | | | |
| Service Descriptor | M | | | |
| Flow Identifier | M | | | |
| NID | M | | | |
| SID | M | | | |
| P_REV | M | | | |
| MIN_P_REV | M | | | |
| NAS message | M | | | |
| Measurement information elements | | | | |
| Measured results on RACH | O | | | |

FIG. 12A

| Information Element | Presence | Range | IE type and reference | Semantics description |
|---|---|---|---|---|
| Message Type | M | | | |
| RTT | M | | | OPERATING TYPE OF CORE NETWORK |
| UE information elements | | | | |
| Inter-System handover failure cause | O | | | FFS |
| Other Information Elements | | | | |
| Inter-System message | O | | | |
|   System Type | | | Enumerated (GSM, 1..15) | |

FIG. 12B

| Information Element | Presence | Range | IE type and reference | Semantics description |
|---|---|---|---|---|
| Message Type | M | | | |
| RTT | M | | | OPERATING TYPE OF CORE NETWORK |
| UE information elements | | | | |
| Inter-System handover failure cause | O | | | FFS |
| Other Information Elements | | | | |
| Inter-System message | O | | | |
|   System Type | | | Enumerated (GSM,1..15 MC) | |
|   Message(s) | | 1..< MaxIntersysMessages > | Bitstring (1..512) | Formatted and coded according to specification for the indicated system type. |

FIG. 12C

| FIELD | DESCRIPTION | SIZE(BIT) |
|---|---|---|
| PILOT_PN | Pilot PN sequence offset index of Target MC System | 9 |
| LC_STATE | Long Code State of Target MC System | 42 |
| SYS_TIME | System Time of Target MC System | 36 |
| CDMA_FREQ | Frequency assignment of Target MC System | 11 |
| USE_TIME | Use action Time indicator<br>This field indicates whether an explicit action time is specified in this message | 1 |
| ACTION_TIME | Action time | 0 or 6 |
| HDM_SEQ | General Handoff Direction Message sequence number | 2 |
| SEARCH_INCLUDED | Pilot search parameters included | 1 |
| SRCH_WIN_A | Search Window size for Active Set and Candidate Set | 0 or 4 |
| SRCH_WIN_N | Search Window size for Neighbor Set | 0 or 4 |
| SRCH_WIN_R | Search Window size for Remaining Set | 0 or 4 |
| T_ADD | Pilot Detection Threshold | 0 or 6 |
| T_DROP | Pilot Drop Threshold | 0 or 6 |
| T_COMP | Active Set versus Candidate Set comparison threshold | 0 or 4 |
| T_TDROP | Drop timer value | 0 or 4 |

FIG. 12D

| | | |
|---|---|---|
| SOFT_SLOPE | The slope in the inequality criterion for adding a pilot to the active set, of dropping a pilot from the active set | 0 or 6 |
| ADD_INTERCEPT | The intercept in the inequality criterion for adding a pilot to the active set | 0 or 6 |
| DROP_INTERCEPT | The intercept in the inequality criterion for dropping a pilot from the active set | 0 or 6 |
| EXTRA_PARMS | Extra parameters included | 1 |
| P_REV | Protocol Revision level | 0 or 8 |
| PACKET_ZONE_ID | Packet data services zone identifier | 0 or 8 |
| FRAME_OFFSET | Frame offset | 0 or 4 |
| PRIVATE_LCM | Private long code mask indicator | 0 or 1 |
| RESET_L2 | Reset acknowledgment procedures command | 0 or 1 |
| RESET_FPC | Reset Forward Traffic Channel power control | 0 or 1 |
| SERV_NEG_TYPE | Service negotiation type | 0 or 2 |
| ENCRYPT_MODE | Message encryption mode | 0 or 1 |
| NOM_PWR_EXT | Extended nominal transmit power | 0 or 4 |
| NOM_PWR | Nominal transmit power offset | 0 or 3 |
| NUM_PREAMBLE | Traffic Channel preamble length | 0 or 5 |
| BAND_CLASS | Band Class | |

FIG. 12E

| | | |
|---|---|---|
| CDMA_FREQ | Frequency assignment | 0 or 11 |
| RETURN_IF_HANDOFF_FAIL | Return on failure flag | 0 or 1 |
| COMPLETE_SEARCH | Flag to complete search | 0 or 1 |
| PERIODIC_SEARCH | Flag to search the Candidate Frequency periodically | 0 or 1 |
| SERVICE_INCLUDED | Service configuration parameters included | 0 or 1 |
| SERV_CON_SEQ | Connect sequence number | 0 or 3 |
| RECORD_TYPE | Information record type | 0 or 8 |
| RECORD_LEN | Information record length | 0 or 8 |
| Type-specific fields | Type-specific fields | 0 or 8x RECORD_LEN |
| SUP_CHAN_PARMS_INCLUDED | Supplemental channel parameters included indicator | 1 |
| FOR_INCLUDED | Forward assignment information included indicator | 0 or 1 |
| FOR_SUP_CONFIG | Forward supplemental Code Channel configuration indicator | 0 or 2 |
| NUM_FOR_SUP | Number of Forward Supplemental Code Channels | 0 or 3 |
| USE_FOR_DURATION | Use Forward duration indicator | 0 or 1 |
| FOR_DURATION | Duration of Forward Supplemental Code Channel assignment | 0 or 8 |
| REV_INCLUDED | Reverse assignment information included indicator | 0 or 1 |

FIG. 12F

| | | |
|---|---|---|
| REV_DTX_DURATION | Reverse Discontinuous Transmission Duration | 0 or 4 |
| CLEAR_RETRY_DELAY | Clear retry delay indicator | 0 or 1 |
| USE_REV_DURATION | Use reverse duration indicator | 0 or 1 |
| REV_DURATION | Duration of Reverse Supplemental Code Channel Assignment | 0 or 8 |
| NUM_REV_CODES | Number of Reverse Supplemental Code Channels | 0 or 3 |
| USE_T_ADD_ABORT | Reverse use T_ADD abort indicator | 0 or 1 |
| REV_PARMS_INCLUDED | Reverse assignment parameters included indicator | 0 or 1 |
| T_MULCHAN | Supplemental Channel Request Message Pilot strength reporting offset | 0 or 3 |
| BEGI_PREAMBLE | Number of preamble frames on Reverse Supplemental Code channels at the beginning of transmission on Reverse Supplemental Code Channel | 0 or 3 |
| RESUME_PREAMBLE | Number of preamble frames on Reverse Supplemental Code Channels at the resumption of transmission | 0 or 3 |
| USE_PWR_CNTL_STEP | Power control step size indicator | 1 |
| PWR_CNTL_STEP | Power control step size | 0 or 3 |
| NUM_PILOTS | Number of pilots included in the message | 3 |
| PILOT_PN | Pilot PN sequence offset index | |
| PWR_COMB_IND | Power control symbol combining indicator | |

FIG. 12G

| | |
|---|---|
| FOR_FUND_CODE_CHAN | Forward Fundamental Channel |
| FOR_SUP_INCLUDED | Forward Supplemental Code Channel included |
| FOR_SUP_CHAN_REC Record | Forward Supplemental Code Channel record |
| FPC_SUBCHAN_GAIN | Forward Power control subchannel relative gain |
| USE_PC_TIME | Use power control action time indicator |
| PC_ACTION_TIME | Power Control Subchannel gain action time |
| RLGAIN_TRAFFIC_PILOT | Gain adjustment of the Reverse Traffic Channel relative to the Reverse Pilot Channel power for Radio Configurations greater than 2 |
| DEFAULT_RLAG | Default reverse link attribute gain used indicator |
| RECORD_TYPE | Information record type |
| RECORD_LEN | Information record length |
| Type-specific fields | Type-specific fields |
| RC_SYNC_ID_INCL | Resource Control synchronization identifier included indicator |
| RC_SYNC_ID | Resource Control synchronization identifier |
| BLOB_INCL | BLOB included indicator |
| BLOB | Resource Control block of bits |

FIG. 15A

| Information Element | Presence | Range | IE type and reference | Semantics description |
|---|---|---|---|---|
| Message Type | M | | | |
| RTT | M | | | OPERATING TYPE OF CORE NETWORK |
| UE information elements | | | | |
| Initial UE identity | M | | | Choice UE id Type (Asynchronous) -IMSI / TMEI / P-TMSI / IMEI |
| U-RNTI | M | | | |
| C-RNTI | O | | | Only if assigned to a common transport channel |
| ⋮ | | | | |
| TDD | | | | |
|    Uplink Timing Advance | O | | | |

FIG. 15B

| Information Element | Presence | Range | IE type and reference | Semantics description |
|---|---|---|---|---|
| Message Type | M | | | |
| RTT | M | | | OPERATING TYPE OF CORE NETWORK |
| UE information elements | | | | |
| Initial UE identity | M | | | Choice UE id Type(Synchronous) -IMSI / TMSI / ESN |
| U-RNTI | M | | | |
| C-RNTI | O | | | Only if assigned to a common transport channel |
| ⋮ | | | | |
| TDD | | | | |
|    Uplink Timing Advance | O | | | |

FIG. 16A

| Information Element | Presence | Range | IE type and reference | Semantics description |
|---|---|---|---|---|
| Message Type | M | | | |
| RTT | M | | | OPERATING TYPE OF CORE NETWORK |
| CN Information elements | | | | |
|    CN domain identity | M | | | |
|    Paging Record Type Identifier | M | | Enumerated (IMSI, TMSI/ P-TMSI) | |
| UE Information elements | | | | |
|    Paging cause | M | | | |

FIG. 16B

| Information Element | Presence | Range | IE type and reference | Semantics description |
|---|---|---|---|---|
| Message Type | M | | | |
| RTT | M | | | OPERATING TYPE OF CORE NETWORK |
| CN Information elements | | | | |
|    NID | M | | | |
|    SID | M | | | |
|    P_REV | M | | | |
|    MIN_P_REV | M | | | |
|    Paging Record Type Identifier | M | | Enumerated (IMSI, TMSI/ ESN) | |
| UE Information elements | | | | |
|    Paging cause | M | | | |

FIG. 17A

| Information Element | Presence | Range | IE type and reference | Semantics description |
|---|---|---|---|---|
| Message Type | M | | | |
| RTT | M | | | OPERATING TYPE OF CORE NETWORK |
| CN Information elements | | | | |
|    CN domain identity | M | | | Indicates which cipher key is Applicable |
| RB Information elements | | | | |
|    Radio bearer identity | | 1 to <maxReco nRBs> | | Radio bearer identity 0 indicates the signalling link and is always present |
| UE information elements | | | | |
|    Activation Time | M | | | Start of the new ciphering configuration in uplink for all the radio bearers |

FIG. 17B

| Information Element | Presence | Range | IE type and reference | Semantics description |
|---|---|---|---|---|
| Message Type | M | | | |
| RTT | M | | | OPERATING TYPE OF CORE NETWORK |
| CN Information elements | | | | |
|    NID | M | | | |
|    SID | M | | | |
|    P_REV | M | | | |
|    MIN_P_REV | M | | | |
| RB Information elements | | | | |
|    Radio bearer identity | | 1 to <maxReco nRBs> | | Radio bearer identity 0 indicates the signalling link and is always present |
| UE information elements | | | | |
|    Activation Time | M | | | Start of the new ciphering configuration in uplink for all the radio bearers |

FIG. 18A

| Information Element | Presence | Range | IE type and reference | Semantics description |
|---|---|---|---|---|
| Message Type | M | | | |
| RTT | M | | | OPERATING TYPE OF CORE NETWORK |
| CN information elements | | | | |
|    NAS binding info | M | | | |
|    CN domain identity | | | | |
| UE information elements | | | | |
| Activation time | O | | | |
| ... | | | | |
| TDD | | | | |
|    Uplink Timing Advance | O | | | |

FIG. 18B

| Information Element | Presence | Range | IE type and reference | Semantics description |
|---|---|---|---|---|
| Message Type | M | | | |
| RTT | M | | | OPERATING TYPE OF CORE NETWORK |
| CN information elements | | | | |
|    NID | M | | | |
|    SID | M | | | |
|    P_REV | M | | | |
|    MIN_P_REV | M | | | |
|    NAS Binding info | M | | | |
| UE information elements | | | | |
| Activation time | O | | | |
| ... | | | | |
| TDD | | | | |
|    Uplink Timing Advance | O | | | |

FIG. 19A

| Information Element | Presence | Range | IE type and reference | Semantics description |
|---|---|---|---|---|
| Message Type | M | | | |
| RTT | M | | | OPERATING TYPE OF CORE NETWORK |
| UE information elements | | | | |
| U-RNTI | O | | | New U-RNTI |
| C-RNTI | O | | | New C-RNTI |
| RLC re-configuration indicator | C-AM_RLC_recon | | | |
| UTRAN DRX cycle length | O | | | |
| DRX Indicator | O | | | |
| UTRAN mobility information elements | | | | |
| URA Identifier | O | | | |
| CN information elements | | | | |
| PLMN identity | O | | | (Note1,2) |
| CN related information | | 0 to <MaxNoC Ndomains> | | CN related information to be provided for each CN domain |
| CN domain identity | O | | | (Note1,2) |
| NAS system info | O | | | (Note1,2) |
| Physical CH information elements (FFS Note 8) | | | | |
| Frequency info | O (FFS) | | | |
| ... | | | | |
| Default DPCH Offset Value | O (FFS) | | | |

FIG. 19B

| Information Element | Presence | Range | IE type and reference | Semantics description |
|---|---|---|---|---|
| Message Type | M | | | |
| RTT | M | | | OPERATING TYPE OF CORE NETWORK |
| UE Information elements | | | | |
| U-RNTI | O | | | New U-RNTI |
| C-RNTI | O | | | New C-RNTI |
| RLC re-configuration indicator | C-AM_RLC_recon | | | |
| UTRAN DRX cycle length | O | | | |
| DRX indicator | O | | | |
| UTRAN mobility information elements | | | | |
| URA identifier | O | | | |
| CN Information elements | | | | |
| NID | O | | | |
| SID | O | | | |
| P_REV | O | | | |
| MIN_P_REV | O | | | |
| Physical CH information elements (FFS Note 5) | | | | |
| Frequency info | O (FFS) | | | |
| ⋮ | | | | |
| Default DPCH Offset Value | O (FFS) | | | |

FIG. 20A

| Information Element | Presence | Range | IE type and reference | Semantics description |
|---|---|---|---|---|
| Message Type | M | | | |
| RTT | M | | | OPERATING TYPE OF CORE NETWORK |
| UE information elements | | | | |
|    U-RNTI | C-CCCH | | | |
|    U-RNTI | O | | | New U-RNTI |
|    C-RNTI | O | | | New C-RNTI |
|    UTRAN DRX cycle length | O | | | |
|    DRX indicator | O | | | |
| UTRAN mobility information elements | | | | |
|    URA identifier | O | | | |
| CN information elements | | | | |
|    PLMN identity | O | | | (Note 1,2) |
|    CN related information | | 0 to <MaxNoCNdomains> | | CN related information to be provided for each CN domain |
|       CN domain identity | O | | | (Note 1,2) |
|       NAS system info | O | | | (Note 1,2) |

FIG. 20B

| Information Element | Presence | Range | IE type and reference | Semantics description |
|---|---|---|---|---|
| Message Type | M | | | |
| RTT | M | | | OPERATING TYPE OF CORE NETWORK |
| UE information elements | | | | |
|    U-RNTI | C-CCCH | | | |
|    U-RNTI | O | | | New U-RNTI |
|    C-RNTI | O | | | New C-RNTI |
|    UTRAN DRX cycle length | O | | | |
|    DRX indicator | O | | | |
| UTRAN mobility information elements | | | | |
|    URA identifier | O | | | |
| CN information elements | | | | |
|    NID | O | | | |
|    SID | O | | | |
|    P_REV | O | | | |
|    MIN_P_REV | O | | | |

FIG. 21A

| Information Element | Presence | Range | IE type and reference | Semantics description |
|---|---|---|---|---|
| Message Type | M | | | |
| RTT | M | | | OPERATING TYPE OF CORE NETWORK |
| UE information elements | | | | |
|    U-RNTI | O | | | New U-RNTI |
|    C-RNTI | O | | | New C-RNTI |
| CN information elements | | | | |
|    PLMN identity | O | | | (Note1,2) |
|    CN related information | | 0 to <MaxNoCNdomains> | | CN related information to be provided for each CN domain |
|       CN domain identity | O | | | (Note1,2) |
|       NAS system info | O | | | (Note1,2) |

FIG. 21B

| Information Element | Presence | Range | IE type and reference | Semantics description |
|---|---|---|---|---|
| Message Type | M | | | |
| RTT | M | | | OPERATING TYPE OF CORE NETWORK |
| UE information elements | | | | |
|    U-RNTI | O | | | New U-RNTI |
|    C-RNTI | O | | | New C-RNTI |
| CN information elements | | | | |
|    NID | O | | | |
|    SID | O | | | |
|    P_REV | O | | | |
|    MIN_P_REV | O | | | |

FIG. 22A

| Information Element | Presence | Range | IE type and reference | Semantics description |
|---|---|---|---|---|
| Message Type | M | | | |
| RTT | M | | | OPERATING TYPE OF CORE NETWORK |
| UE information elements | | | | |
|   U-RNTI | O | | | New U-RNTI |
|   Activation time | O | | | |
| CN information elements | | | | |
|   PLMN identity | O | | | (Note3) |
|   CN related information | | 0 to <MaxNoCNdomains> | | CN related information to be provided for each CN domain |
|   CN domain identity | O | | | (Note3) |
|   NAS system info | O | | | (Note3) |
| Phy CH information elements | | | | |
| ⋮ | | | | |
| SSDT indicator | O | | | |

FIG. 22B

| Information Element | Presence | Range | IE type and reference | Semantics description |
|---|---|---|---|---|
| Message Type | M | | | |
| RTT | M | | | OPERATING TYPE OF CORE NETWORK |
| UE information elements | | | | |
|   U-RNTI | O | | | New U-RNTI |
|   Activation time | O | | | |
| CN information elements | | | | |
|   NID | O | | | |
|   SID | O | | | |
|   P_REV | O | | | |
|   MIN_P_REV | O | | | |
| Phy CH information elements | | | | |
| ⋮ | | | | |
| SSDT indicator | O | | | |

FIG. 23A

| Information Element | Presence | Range | IE type and reference | Semantics description |
|---|---|---|---|---|
| Message Type | M | | | |
| RTT | M | | | OPERATING TYPE OF CORE NETWORK |
| UE information elements | | | | |
| U-RNTI | O | | | New U-RNTI |
| CHOICE mode | | | | |
|   TDD | | | | |
|     C-RNTI | | | | |
| CN information elements | O | | | |
| PLMN identity | O | | | (Note2) |
| CN related information | | 0 to <MaxNoC Ndomains> | | CN related information to be provided for each CN domain |
|   CN domain identity | O | | | (Note2) |
|   NAS system info | O | | | (Note2) |
| Phy CH information elements | | | | |
| ⋮ | | | | |
| TDD | | | | |
|   Uplink Timing Advance | O | | | |

FIG. 23B

| Information Element | Presence | Range | IE type and reference | Semantics description |
|---|---|---|---|---|
| Message Type | M | | | |
| RTT | M | | | OPERATING TYPE OF CORE NETWORK |
| UE information elements | | | | |
| U-RNTI | O | | | New U-RNTI |
| CHOICE mode | | | | |
|   TDD | | | | |
|     C-RNTI | | | | |
| CN information elements | O | | | |
|   NID | O | | | |
|   SID | O | | | |
|   P_REV | O | | | |
|   MIN_P_REV | O | | | |
| Phy CH information elements | | | | |
| ⋮ | | | | |
| TDD | | | | |
|   Uplink Timing Advance | O | | | |

FIG. 24A

| Information Element | Presence | Range | IE type and reference | Semantics description |
|---|---|---|---|---|
| Message Type | M | | | |
| RTT | M | | | OPERATING TYPE OF CORE NETWORK |
| UE information elements | | | | |
| Activation time | O | | | |
| Other information Elements | | | | |
| Inter-System message | M | | | |
| System Type | | | Enumerated (GSM, 1..15) | |
| Message(s) | | 1..< MaxIntersy sMessages > | Bitstring (1..512) | Formatted and coded according to specification for the indicated system type. |

FIG. 24B

| Information Element | Presence | Range | IE type and reference | Semantics description |
|---|---|---|---|---|
| Message Type | M | | | |
| RTT | M | | | OPERATING TYPE OF CORE NETWORK |
| UE information elements | | | | |
| Activation time | O | | | |
| Other information Elements | | | | |
| Inter-System message | M | | | |
| System Type | M | | Enumerated (GSM, 1..15, BSC, MC) | |
| Message(s) | | 1..< MaxIntersy sMessages > | Bitstring (1..512) | Formatted and coded according to specification for the indicated system type. |

FIG. 24C

| Field | Size(bit) |
|---|---|
| PILOT_PN | 9 |
| LC_STATE | 42 |
| SYS_TIME | 36 |
| CDMA_FREQ | 11 |
| USE_TIME | 1 |
| ACTION_TIME | 0 or 6 |
| HDM_SEQ | 2 |
| SEARCH_INCLUDED | 1 |
| SRCH_WIN_A | 0 or 4 |
| SRCH_WIN_N | 0 or 4 |
| SRCH_WIN_R | 0 or 4 |
| T_ADD | 0 or 6 |
| T_DROP | 0 or 5 |
| T_COMP | 0 or 4 |
| T_TDROP | 0 or 4 |
| SOFT_SLOPE | 0 or 6 |
| ADD_INTERCEPT | 0 or 6 |
| DROP_INTERCEPT | 0 or 8 |
| EXTRA_PARMS | 1 |
| P_REV | 0 or 8 |
| PACKET_ZONE_ID | 0 or 8 |
| FRAME_OFFSET | 0 or 4 |
| PRIVATE_LCM | 0 or 1 |
| RESET_L2 | 0 or 1 |
| RESET_FPC | 0 or 1 |
| SERV_NEG_TYPE | 0 or 1 |
| ENCRYPT_MODE | 0 or 2 |
| NOM_PWR_EXT | 0 or 1 |
| NOM_PWR | 0 or 4 |
| NUM_PREAMBLE | 0 or 3 |
| BAND_CLASS | 0 or 5 |
| CDMA_FREQ | 0 or 11 |
| RETURN_IF_HANDOFF_FAIL | 0 or 1 |

FIG. 24D

| | |
|---|---|
| COMPLETE_SEARCH | 0 or 1 |
| PERIODIC_SEARCH | 0 or 1 |
| SERVICE_INCLUDED | 0 or 1 |
| SERV_CON_SEQ | 0 or 3 |
| RECORD_TYPE | 0 or 5 |
| RECORD_LEN | 0 or 8 |
| Type-specific fields | 0 or 8xRECORD_LEN |
| SUP_CHAN_PARMS_INCLUDED | 1 |
| FOR_INCLUDED | 0 or 1 |
| FOR_SUP_CONFIG | 0 or 2 |
| NUM_FOR_SUP | 0 or 3 |
| USE_FOR_DURATION | 0 or 1 |
| FOR_DURATION | 0 or 8 |
| REV_INCLUDED | 0 or 1 |
| REV_DTX_DURATION | 0 or 4 |
| CLEAR_RETRY_DELAY | 0 or 1 |
| USE_REV_DURATION | 0 or 1 |
| REV_DURATION | 0 or 8 |
| NUM_REV_CODES | 0 or 3 |
| USE_T_ADD_ABORT | 0 or 1 |
| REV_PARMS_INCLUDED | 0 or 1 |
| T_MULCHAN | 0 or 3 |
| BEGI_PREAMBLE | 0 or 3 |
| RESUME_PREAMBLE | 0 or 3 |

FIG. 24E

| | |
|---|---|
| USE_PWR_CNTL_STEP | 1 |
| PWR_CNTL_STEP | 0 or 3 |
| NUM_PILOTS | |
| PILOT_PN | |
| PWR_COMB_IND | |
| FOR_FUND_CODE_CHAN | |
| FOR_SUP_INCLUDED | |
| FOR_SUP_CHAN_REC Record | |
| FPC_SUBCHAN_GAIN | |
| USE_PC_TIME | |
| PC_ACTION_TIME | |
| RLGAIN_TRAFFIC_PILOT | |
| DEFAULT_RLAG | |
| RECORD_TYPE | |
| RECORD_LEN | |
| Type-specific fields | |
| RC_SYNC_ID_INCL | |
| RC_SYNC_ID | |
| BLOB_INCL | |
| BLOB | |

METHOD FOR TRANSMITTING RADIO RESOURCE CONTROL MESSAGE IN ASYNCHRONOUS MOBILE COMMUNICATION SYSTEM

FIELD OF THE INVENTION

The present invention relates in general to a method for transmitting a radio resource control (RRC) message in an asynchronous mobile communication system; and, more particularly to a method for transmitting a radio resource control (RRC) message between an asynchronous mobile station and an asynchronous mobile network regardless of an operating type of a core network.

DESCRIPTION OF THE PRIOR ART

In a conventional synchronous mobile telecommunications system, a synchronous mobile station is connected to a synchronous radio network (for example, a CDMA-2000 radio network), and a synchronous radio network is connected to an ANSI-41 core network.

In a conventional asynchronous mobile telecommunications system, an asynchronous mobile station is connected to an asynchronous radio network (for example, a universal mobile telecommunication system (UMTS) terrestrial radio access network (UTRAN)), and an asynchronous radio network is connected to a global system for mobile communication-mobile application part (GSM-MAP) core network.

FIG. 1A is a view showing the core network interface architecture of the conventional synchronous mobile telecommunications system. In this drawing, the reference numeral 11 denotes a synchronous mobile station, 12 denotes a synchronous radio network (i.e., a code division multiple access-2000 (CDMA-2000) radio network) which performs a data interfacing operation with the synchronous mobile station 11 and includes a synchronous base transceiver station/base station controller (BTS/BSC), and 13 denotes a synchronous core network (i.e., an ANSI-41 core network) which is connected to the synchronous radio network 12 and includes a synchronous mobile services switching center (MSC) 14.

In the above core network interface architecture of the conventional synchronous mobile telecommunications system, the synchronous mobile station 11 can be connected to only the synchronous radio network 12 as well known to one skilled in the art, which is in turn connected to the synchronous core network 13, thereby allowing the synchronous mobile station 11 to be interfaced with only the synchronous core network 13.

FIG. 1B is a view showing the core network interface architecture of the conventional asynchronous mobile telecommunications system. In this drawing, the reference numeral 21 denotes an asynchronous mobile station, 22 denotes an asynchronous radio network (i.e., a UTRAN) which includes a Node B which is similar to base transceiver station (BTS) and a radio network controller (RNC), and 23 denotes an asynchronous core network which includes an asynchronous mobile services switching center (MSC) 24 connected to the UTRAN 22.

In the above core network interface architecture of the conventional asynchronous mobile telecommunications system, the asynchronous mobile station 21 is connected to the asynchronous radio network 22 (i.e., UTRAN) which is in turn connected to the asynchronous core network 23, thereby allowing the asynchronous mobile station 21 to perform a data interfacing operation with the asynchronous core network 23.

FIG. 2A is a view showing the layered protocol structure of the conventional synchronous mobile telecommunications system. In this drawing, the reference numeral 30 denotes a synchronous mobile station, 40 a synchronous radio network and 50 a synchronous core network connected to the synchronous radio network 40.

The synchronous mobile station 30 comprises a layer3 31, a layer2 35 and a layer1 36. The layer3 31 includes a synchronous call control (CC) entity 32 for management of a call and a synchronous mobility management (MM) entity 33 for management of a mobility.

The layer1 36 is a physical layer which offers data transport services to higher layers and transfers transport blocks over a radio interface.

The layer2 35 is a data link layer which includes following sub layers, a medium access control (MAC) sub layer and a radio link control (RLC) sub layer. However, the sub layers are not shown in this drawing.

The MAC sub layer offers data transfer services on logical channels to a higher layer (RLC sub layer) and on transport channels to a lower layer (the physical layer 36). The MAC sub layer is responsible for mapping of the logical channel onto the appropriate transports channel.

The RLC sub layer offers data transfer services on primitive to a higher layer and on logical channels to a lower layer (MAC sub layer). Also, the RLC sub layer performs error correction, duplicate detection, ciphering and flow control of the data.

The layer3 31 is a network layer which includes following sub layers, a synchronous radio resource (RR) sub layer, a synchronous call control (CC) entity 32 and a mobility management (MM) entity 33. In synchronous system, the synchronous RR sub layer is not apparently separated from the others in the layer3 31.

The RR sub layer offers data transfer services on primitive to a lower layer (RLC sub layer) and handles a radio resource control signaling of the layer3 31 between a user equipment (UE) and a synchronous radio network. The RR sub layer manages a radio resource. Also, the RR sub layer assigns/re-configures/releases the radio resource to UE/UTRAN.

The CC entity handles a call control signaling of layer3 between the UEs and the synchronous radio network.

The MM entity handles a mobility management signaling of layer3 between the user equipments (UEs) and the synchronous radio network.

The layers 3 to 1 31, 35 and 36 in the synchronous mobile station 30 communicate with corresponding layers 41, 45 and 46 in the synchronous radio network 40.

The synchronous radio network 40 comprises a layer3 41, a layer2 45 and a layer1 46. The layers 3 to 1 in the synchronous radio network 40 correspond respectively to those in the synchronous mobile station 30.

The layers 3 to 1 41, 45 and 46 in the synchronous radio network 40 communicate with corresponding layers 31, 35, 36, 51, 55 and 56 in the synchronous mobile station and the synchronous core network 50.

The synchronous core network 50 comprises a layer3 51, a layer2 55 and a layer1 56. The layers 3 to 1 in the synchronous radio network 50 correspond respectively to those in the synchronous mobile station 30.

The layers 3 to 1 51, 55 and 56 in the synchronous core network 50 communicate with corresponding layers 41, 45 and 46 in the synchronous radio network 40.

In the conventional synchronous mobile station and radio network as the layered protocol structure, the synchronous mobile station 30 receives a Sync channel message from the synchronous radio network 40 over a Sync channel and acquires information necessary to its connection to the synchronous core network 50, including information related to the synchronous core network 50 and information about the synchronous radio network 40, from the received Sync channel message.

In other words, for interfacing with the synchronous ANSI-41 network via the synchronous radio network, the synchronous mobile station acquires system information (i.e., information related to the radio network and core network) through a system determination sub-state, a pilot channel acquisition sub-state, a Sync channel acquisition sub-state and a timing changing sub-state after it is powered on.

FIG. 2B is a view showing the layered protocol structure of the conventional asynchronous mobile telecommunications system. In this drawing, the reference numeral 60 denotes an asynchronous mobile station, 70 a UTRAN and 80 an asynchronous core network.

The asynchronous mobile station 60 comprises a layer3 61, a layer2 65 and a layer1 66. In particular, the layer3 61 includes a non-access stratum (NAS) part and an access stratum (AS) part. The NAS part includes an asynchronous call control (CC) part 62 for management of a call and an asynchronous mobility management (MM) part 63 for management of a mobility. The AS part includes an asynchronous radio resource control (RRC) part. In the asynchronous system, the asynchronous RRC sub layer is apparently separated from the NAS part. Functions of the asynchronous RRC sub layer are similar with those of the synchronous RR sub layer.

The UTRAN 70 comprises a layer3 71, a layer2 73 and a layer1 74. The layer3 71 of the UTRAN 70 has no NAS part having asynchronous CC part and asynchronous MM part. The layers 3 to 1 of the UTRAN 70 are connected and correspond respectively to those in the asynchronous mobile station 60 and those in the asynchronous core network 80. However, since the UTRAN 70 does not have the NAS part, i.e., the asynchronous CC part and the asynchronous MM part, the NAS parts of the asynchronous mobile station 60 and the asynchronous core network 80 are coupled to each other not through the UTRAN 70.

The asynchronous core network 80 comprises a layer3 having a NAS part 81 connected to that of the asynchronous mobile station 60 and a AS part, a layer2 85 and a layer1 86 connected respectively to those in the UTRAN 70. The NAS part comprises an asynchronous CC part 82 for management of a call and an asynchronous MM part 83 for management of a mobility.

Functions of the layer 3 to 1 of the asynchronous system are similar with those of the synchronous system except for an operating type. Therefore, detailed description of the layer 3 to 1 will be skipped.

The more detailed descriptions about layered protocol structures are well taught in $3^{rd}$ Generation Partnership Project (3GPP), Technical Specification Group (TSG)— Radio Access Network (RAN): 3G TS25.301 (Radio Interface Protocol Architecture), 3G TS25.302 (Services provided by the physical layer), 3G TS25.321 (MAC Protocol Specification), 3G TS25.322 (RLC Protocol Specification) and 3G TS25.331 (RRC Protocol Specification) in detail.

IMT-2000 systems are the third generation systems which aim to unify the various mobile communication networks and services into one to provide many mobile communication services. The systems can provide multimedia services under multi-environments through various qualities of services and high capacity. Also, in the aspect of services, the systems can provide multimedia services of speech, image and data up to the rate of 2 Mbps and an international roaming. And, in the aspect of network, the systems are total systems which are based on ATM networks and combine fixed and wireless systems.

IMT-2000 system requires new system concept, high-level adaptation technology, and novel network technology, as well all conventional technologies which were already adopted in the second digital cellular system.

As described above, in the next-generation mobile telecommunication system such as the IMT-2000 system, either the GSM-MAP network used in the above conventional asynchronous mobile telecommunications system or the ANSI-41 network used in the above conventional synchronous mobile telecommunications system should be employed as a core network in order to perform an international roaming in a synchronous or asynchronous mobile telecommunications system of an IMT-2000 system.

According to network deployment scenarios, the IMT-2000 system can have the following four interface architectures; first: synchronous mobile station—synchronous radio network—synchronous ANSI-41 core network, second: synchronous mobile station—synchronous radio network—asynchronous GSM-MAP core network, third: asynchronous mobile station—asynchronous radio core network—synchronous ANSI-41 network and fourth: asynchronous mobile station—asynchronous radio network—asynchronous GSM-MAP core network.

The IMT-2000 system has the four interface architectures as mentioned above. Therefore, the hybrid type synchronous mobile station must recognize an operating type of a core network currently connected thereto, and the hybrid type synchronous radio network should provide core network operating type information and others information to the hybrid type synchronous mobile station. The core network operating type information and the others information must be contained in the Sync channel message that the synchronous mobile station, after being powered on, receives through the Sync channel in the above-mentioned conventional interfacing manner.

Similarly, the hybrid type asynchronous mobile station must recognize an operating type of a core network currently connected thereto, and the hybrid type asynchronous radio network should provide the core network operating type information and others information to the hybrid type asynchronous mobile station. The core network operating type information and the others information must be contained in the system information message transmitted to the asynchronous mobile station, after being powered on, so that the asynchronous mobile station receives through the broadcast control channel (BCCH) in the above-mentioned conventional interfacing manner.

FIG. 3A is a view showing a synchronous ANSI-41 core network interface architecture of a hybrid type synchronous radio network. In this drawing, the reference numeral 100 denotes a hybrid type synchronous mobile station, 110 a hybrid type synchronous radio network, and 120 a synchronous ANSI-41 core network which includes a synchronous Mobile Switching Center (MSC).

FIG. 3B is a view showing an asynchronous GSM-MAP core network interface architecture of the hybrid type synchronous radio network. In this drawing, the reference numeral 100 denotes a hybrid type synchronous mobile station, 110 a hybrid type synchronous radio network, and 130 an asynchronous GSM-MAP core network which includes an asynchronous Mobile Switching Center (MSC).

FIG. 3C is a view showing an asynchronous GSM-MAP core network interface architecture of a hybrid type asynchronous radio network. In this drawing, the reference numeral 210 denotes a hybrid type asynchronous mobile station, 220 denotes a hybrid type UTRAN which is a hybrid type asynchronous radio network, and 230 denotes an asynchronous GSM-MAP core network which is connected to the hybrid type UTRAN 220 and includes an asynchronous Mobile Switching Center (MSC).

FIG. 3D is a view showing a synchronous ANSI-41 core network interface architecture of the hybrid type asynchronous radio network. In this drawing, the reference numeral 210 denotes a hybrid type asynchronous mobile station, 220 denotes a hybrid type UTRAN which is a hybrid type asynchronous radio network, and 240 denotes a synchronous ANSI-41 core network which is connected to the hybrid type UTRAN 220 and includes a synchronous Mobile Switching Center (MSC).

In order to be operable adaptively to the above four interface architectures, each of the hybrid type synchronous and asynchronous mobile stations in the next-generation mobile telecommunications system has both asynchronous CC and MM protocol entities serving for the GSM-MAP core network and synchronous CC and MM protocol entities serving for the ANSI-41 core network at the layer3 in the protocol stack structure, which is a different from each of the conventional synchronous and asynchronous mobile stations.

FIG. 4A is a view showing the layered protocol structure of a hybrid type synchronous mobile station, a hybrid type synchronous radio network and the synchronous ANSI-41 core network. In this drawing, the reference numeral 100 denotes a hybrid type synchronous mobile station, 110 denotes a hybrid type synchronous radio network, and 120 denotes an ANSI-41 core network which is a synchronous core network connected to the hybrid type synchronous radio network 110.

The hybrid type synchronous mobile station 100 comprises a layer3 101, a layer2 107 and a layer1 108. The layer3 101 comprises a synchronous CC part 102, a synchronous MM part 103, an asynchronous CC part 104, an asynchronous MM part 105 and a synchronous radio resource part 106. The hybrid type synchronous mobile station 100 selectively makes a CC/MM protocol active according to a core network operating type. Information for identifying the core network operating type is given to the hybrid type synchronous mobile station 100.

For example, if the hybrid type synchronous mobile station 100 is currently connected to the ANSI-41 core network 120, the layer3 101 therein activates protocols of the synchronous CC part 102 and synchronous MM part 103 to perform a message interfacing operation with the ANSI-41 core network 120.

The hybrid type synchronous radio network 110 comprises a layer3 111, a layer2 115 and a layer1 116, which activate their protocols corresponding respectively to those in the hybrid type synchronous mobile station 100 and those in the ANSI-41 core network 120 to transmit and receive messages.

The ANSI-41 core network 120 comprises a layer3 121, a layer2 125 and a layer1 126. The layer3 121 comprises a synchronous CC part 122, a synchronous MM part 123 and a synchronous RR part 124.

Functions of each layer in the hybrid type synchronous radio network and the synchronous core network are similar to those in the hybrid type synchronous mobile station, and therefore, detailed description on the functions will be skipped in this specification.

On the other hand, a hybrid type synchronous mobile station, a hybrid type synchronous radio network and an asynchronous core network have layered protocol structures as shown in FIG. 4B when the core network connected thereto is of an asynchronous operating type as shown in FIG. 3B.

In FIG. 4B, the reference numeral 100 denotes a hybrid type synchronous mobile station, 110 denotes a hybrid type synchronous radio network, and 130 denotes a GSM-MAP core network which is an asynchronous core network.

The hybrid type synchronous mobile station 100 comprises a layer3 101, a layer2 107 and a layer1 108. The layer3 101 includes a synchronous CC part 102, a synchronous MM part 103, an asynchronous CC part 104, an asynchronous MM part 105 and a synchronous RR part 106. The hybrid type synchronous mobile station 100 selectively makes a CC/MM protocol active according to a core network operating type.

For example, if the hybrid type synchronous mobile station 100 is currently connected to the GSM-MAP core network 130, the layer3 101 therein activates protocols of the asynchronous CC part 104 and asynchronous MM part 105 to perform a message interfacing operation with the GSM-MAP core network 130.

The hybrid type synchronous radio network 110 comprises a layer3 111, a layer2 115 and a layer1 116, which activate their protocols corresponding respectively to those in the hybrid type synchronous mobile station 100 and those in the GSM-MAP core network 130 to transmit and receive messages.

The GSM-MAP core network 130 comprises a layer3 131, a layer2 135 and a layer1 136. The layer 3 131 includes an asynchronous CC part 132 and an asynchronous MM part 133, an asynchronous RRC part 134.

The layers 3 to 1 of the hybrid type synchronous radio network 110 are connected and correspond respectively to those in the hybrid type synchronous mobile station 100 and those in the asynchronous core network 130. However, the layer3 101 of the hybrid type asynchronous mobile station 100 and the layer 3 131 of the asynchronous core network 130 are coupled to each other not through the hybrid type synchronous radio network 110.

FIG. 4C is a view showing layered protocol structures of a hybrid type asynchronous mobile station, a hybrid type asynchronous radio network and a synchronous ANSI-41 core network. In this drawing, the reference numeral 210 denotes a hybrid type asynchronous mobile station, 220 denotes a hybrid type UTRAN which is a hybrid type asynchronous radio network, and 230 denotes an ANSI-41 core network connected to the hybrid type UTRAN 220.

The hybrid type asynchronous mobile station 210 comprises a layer3 211, a layer2 217 and a layer1 218. The layer1 includes a synchronous CC part 212, a synchronous MM part 213, an asynchronous CC part 214, an asynchronous MM part 215 and asynchronous RRC part 216 and selectively activates a synchronous CC/MM protocol or an asynchronous CC/MM protocol.

For example, if the hybrid type asynchronous mobile station 210 is currently connected to the ANSI-41 core network 230, the layer 3 211 therein activates a protocol between the synchronous CC part 212 and synchronous MM part 213 to perform a message interfacing operation with the ANSI-41 core network 230.

FIG. 4D is a view showing layered protocol structures of a hybrid type asynchronous mobile station, a hybrid type asynchronous radio network and an asynchronous GSM-MAP core network. In this drawing, the reference numeral 210 denotes a hybrid type asynchronous mobile station, 220 denotes hybrid type a UTRAN which is a hybrid type asynchronous radio network, and 240 denotes an asynchronous GSM-MAP core network connected to the hybrid type UTRAN 220.

The hybrid type asynchronous mobile station 210 comprises a layer3 211 having a NAS part and an AS part, a layer2 217 and a layer1 218. The NAS part includes a synchronous CC part 212, a synchronous MM part 213, an asynchronous CC part 214 and an asynchronous MM part 215 and selectively activates a synchronous CC/MM protocol or an asynchronous CC/MM protocol. The AS part includes an asynchronous RRC part 216.

The hybrid type asynchronous radio network 220 comprises a layer3 221, a layer2 225 and a layer1 226, which activate their protocols corresponding respectively to those in the hybrid type synchronous mobile station 210 and those in the GSM-MAP core network 240 to transmit and receive messages.

The GSM-MAP core network 240 comprises a layer3 241 having a NAS part and an AS part, a layer2 245 and a layer1 246. The NAS part includes an asynchronous CC part 242 and an asynchronous MM part 243. The AS part includes an asynchronous RRC part 244.

For example, if the hybrid type asynchronous mobile station 210 is currently connected to the GSM-MAP core network 240, the NAS part therein activates protocols of the asynchronous CC part 214 and asynchronous MM part 215 to perform a message interfacing operation with the GSM-MAP core network 240.

The layers 3 to 1 of the hybrid type asynchronous radio network 220 are connected and correspond respectively to those in the hybrid type synchronous mobile station 210 and those in the asynchronous core network 240. However, the NAS parts of the hybrid type asynchronous mobile station 210 and the asynchronous core network 240 are coupled to each other not through the hybrid type asynchronous radio network 220.

A communication protocol between a synchronous mobile station and a synchronous mobile network is referred to an Air-interface protocol. For example, a TIA/EIA/IS2000 protocol is used as the Air-interface protocol.

A communication protocol between a synchronous radio network and a synchronous core network, for example, an ANSI-41 network is referred to an A-interface protocol. For example, a three generation interoperablility specification (3G-IOS) is used as the A-interface protocol.

In case of an asynchronous communication system, in other words, in a system having an asynchronous mobile station, an asynchronous mobile network and an asynchronous core network, each of the asynchronous mobile station and the asynchronous mobile network has a RRC protocol entity and communicates messages used in the RRC protocol entity with each other.

The RRC protocol entity means a protocol entity which manages and controls a radio resource between the asynchronous mobile station and the asynchronous mobile network. The radio resource management and control are performed by a message defined in the RRC protocol entity (as is referred to "a RRC message" in this specification).

The RRC messages can be classified according to its function as follows:

1) RRC message related to a connection management;
2) RRC message related to a radio bearer;
3) RRC message related to a connection mobility; and
4) RRC message related to a measurement control.

The RRC message related to a connection management includes information related to a connection and release between the asynchronous mobile station and the asynchronous mobile network, operations after connection and information to be broadcasted to the mobile station.

The RRC message related to the radio bearer includes RRC messages having information related to an allocation of the radio resource between the asynchronous mobile station and the asynchronous mobile network, a reconfiguration of the radio resource, etc.

The RRC message related to the connection mobility includes RRC messages having information related to a mobility of the mobile station and a handover.

The RRC message related to the measurement control includes RRC messages having information related to measurement, confirmation and management of a present configuration of the radio resource.

The RRC messages includes information elements as follows:

1) Information element related to a core network;
2) Information element related to a mobility of UTRAN;
3) Information element related to a UE;
4) Information element related to a radio bearer;
5) Information element related to a transport channel;
6) Information element related to a physical channel; and
7) Information element related to a measurement.

All or a part of information elements are included in each of the RRC messages. Each of the information elements has a plurality of information fields. All or a part of the plurality of information fields are communicated between the mobile station and the radio network in accordance with a function and a use.

Each of the asynchronous mobile station and the asynchronous radio network stores and uses the information elements related to the radio resource, the information elements included in the RRC message, in the RRC protocol entity. Each of the asynchronous mobile station and the asynchronous radio network stores and uses the information elements not related to the radio resource in the CC/MM protocol entity included in the layer3.

The RRC messages, the information elements included in the RRC message and the information fields included in the information elements are defined for the asynchronous communication system.

However, in the IMT-2000 system, the asynchronous mobile station and radio network can be coupled to the synchronous core network. Accordingly, if the present information elements having the present information fields are used, the asynchronous mobile station cannot be interfaced with the synchronous core network.

In order to interface the asynchronous mobile station and the radio network with the synchronous core network, the information elements should have information fields used for the synchronous CC/MM protocol entity.

SUMMARY OF THE INVENTION

Therefore, the present invention has been made in view of the above problems, and it is an object of the present invention to provide a method for transmitting a radio resource control (RRC) message in an asynchronous mobile communication system regardless of an operating type of a core network coupled to the asynchronous mobile communication system network.

In accordance with one aspect of the present invention, there is provided a method for transmitting a radio resource contorl (RRC) message from an asynchronous mobile station to an asynchronous radio network in an asynchronous mobile communication system, the method comprising the steps of: a) determining whether a core network is a synchronous core network or an asynchronous core network; b) if the core network is the synchronous core network, generating a RRC message having information related to the synchronous core network; and c) transmitting the RRC message to the asynchronous radio network.

In accordance with another aspect of the present invention, there is provided a method for transmitting a radio resource control (RRC) message from an asynchronous radio network to an asynchronous mobile station in an asynchronous mobile communication system, the method comprising the steps of: a) determining whether a core network is a synchronous core network or an asynchronous core network; b) if the core network is the synchronous core network, generating a RRC message having information related to the synchronous core network; and c) transmitting the RRC message to the asynchronous mobile station.

BRIEF DESCRIPTION OF THE DRAWINGS

The above and other objects, features and advantages of the present invention will be more clearly understood from the following detailed description taken in conjunction with the accompanying drawings, in which:

FIG. 4A is a view showing layered protocol structures of hybrid type synchronous mobile station and radio network and the synchronous ANSI-41 core network;

FIG. 4B is a view showing layered protocol structures of hybrid type synchronous mobile station and radio network and the asynchronous GSM-MAP core network;

FIG. 4C is a view showing layered protocol structures of hybrid type asynchronous mobile station and radio network and the synchronous ANSI-41 core network;

FIG. 7A is a diagram of a RRC connection request message when a core network is a GSM-MAP network;

FIG. 7B is a diagram of a RRC connection request message when a core network is an ANSI-41 network;

FIG. 8A is a diagram of a RRC connection re-establishment request message when a core network is a GSM-MAP network;

FIG. 8B is a diagram of a RRC connection re-establishment request message when a core network is an ANSI-41 network;

FIG. 9A is a diagram of a RRC UE capability information message when a core network is a GSM-MAP network;

FIG. 9B is a diagram of a RRC UE capability information message when a core network is an ANSI-41 network;

FIG. 10A is a diagram of a RRC downlink direct transfer message when a core network is a GSM-MAP network;

FIG. 10B is a diagram of a RRC downlink direct transfer message when a core network is an ANSI-41 network;

FIG. 11A is a diagram of an initial direct transfer message when a core network is a GSM-MAP network;

FIG. 11B is a diagram of a RRC initial direct transfer message when a core network is an ANSI-41 network;

FIG. 12A is a diagram of a RRC inter-system handover failure message when a core network is a GSM-MAP network;

FIG. 12B is a diagram of a RRC inter-system handover failure message when a core network is an ANSI-41 network;

FIGS. 12C to 12G are diagrams illustrating contents of a message field included in the RRC inter-system handover failure message of FIG. 12B;

FIG. 15A is a diagram of a RRC connection setup message when a core network is a GSM-MAP network;

FIG. 15B is a diagram of a RRC connection setup message when a core network is an ANSI-41 network;

FIG. 16A is a diagram of a RRC paging message when a core network is a GSM-MAP network;

FIG. 16B is a diagram of a RRC paging message when a core network is an ANSI-41 network;

FIG. 17A is a diagram of a RRC security mode control message when a core network is a GSM-MAP network;

FIG. 17B is a diagram of a RRC security mode control message when a core network is an ANSI-41 network;

FIG. 18A is a diagram of a RRC radio bearer setup message when a core network is a GSM-MAP network;

FIG. 18B is a diagram of a RRC radio bearer setup message when a core network is an ANSI-41 network;

FIG. 19A is a diagram of a RRC cell update confirm message when a core network is a GSM-MAP network;

FIG. 19B is a diagram of a RRC cell update confirm message when a core network is an ANSI-41 network;

FIG. 20A is a diagram of a RRC URA update confirm message when a core network is a GSM-MAP network;

FIG. 20B is a diagram of a RRC URA update confirm message when a core network is an ANSI-41 network;

FIG. 21A is a diagram of a RRC RNTI reallocation message when a core network is a GSM-MAP network;

FIG. 21B is a diagram of a RRC RNTI reallocation message when a core network is an ANSI-41 network;

FIG. 22A is a diagram of a RRC active set update message when a core network is a GSM-MAP network;

FIG. 22B is a diagram of a RRC active set update message when a core network is an ANSI-41 network;

FIG. 23A is a diagram of a RRC handover command message when a core network is a GSM-MAP network;

FIG. 23B is a diagram of a RRC handover command message when a core network is an ANSI-41 network;

FIG. 24A is a diagram of a RRC inter-system handover command message when a core network is a GSM-MAP network;

FIG. 24B is a diagram of a RRC inter-system handover command message when a core network is an ANSI-41 network; and FIGS. 24C to 24E are diagrams illustrating contents of a message field included in the RRC inter-system handover command message of FIG. 24B.

DETAILED DESCRIPTION OF THE PREFERRED EMBODIMENTS

Figure 1A:
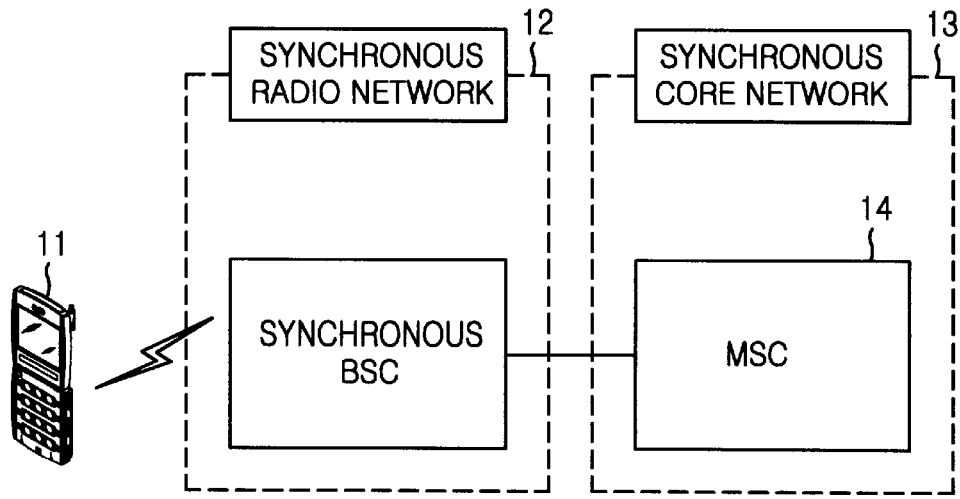
FIG. 1A is a view showing a core network interface architecture of the conventional synchronous mobile telecommunications system.
Figure 1B:
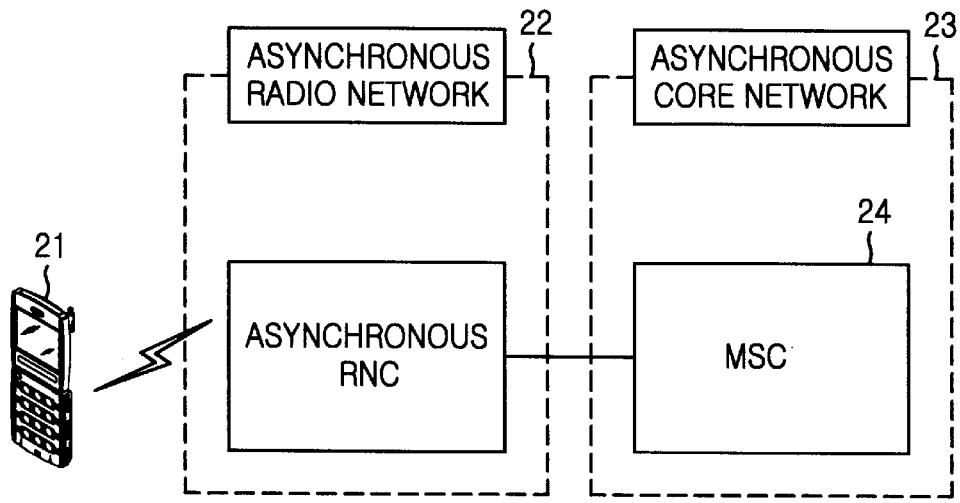
FIG. 1B is a view showing a core network interface architecture of the conventional asynchronous mobile telecommunications system.
Figure 2A:
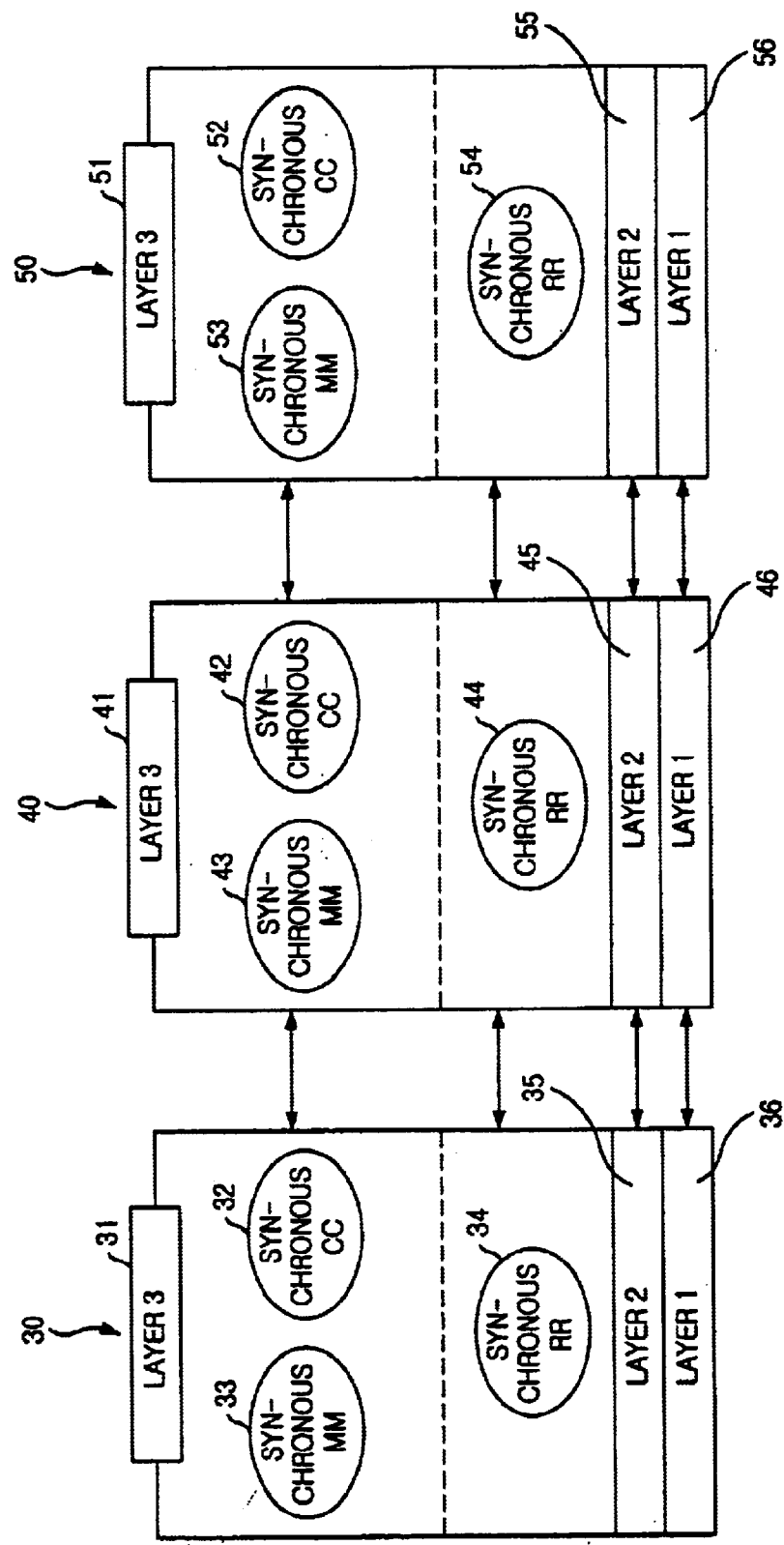
FIG. 2A is a view showing a layered protocol structure of the conventional synchronous mobile telecommunications system.
Figure 2B:
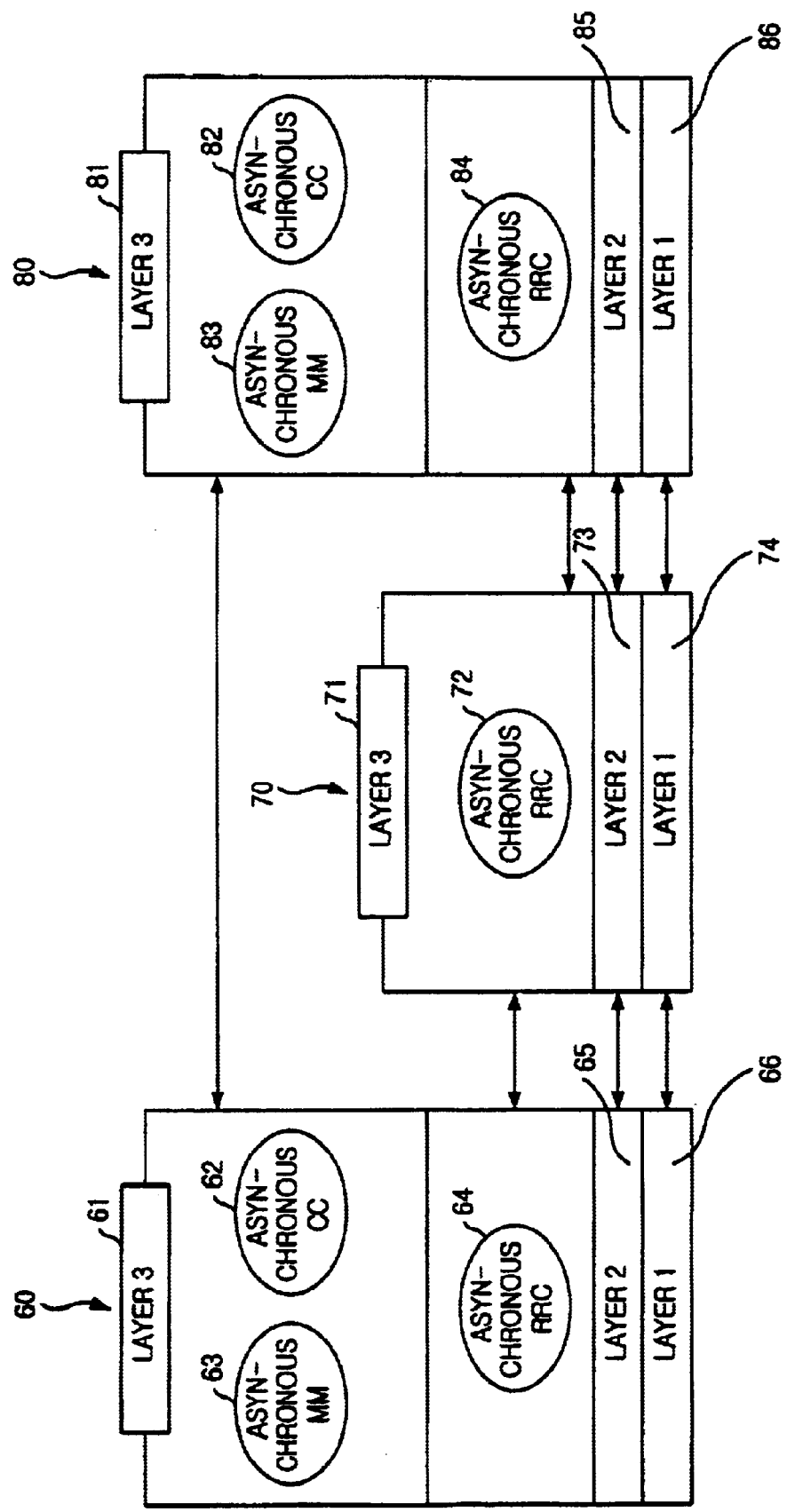
FIG. 2B is a view showing a layered protocol structure of the conventional asynchronous mobile telecommunications system.
Figure 3A:
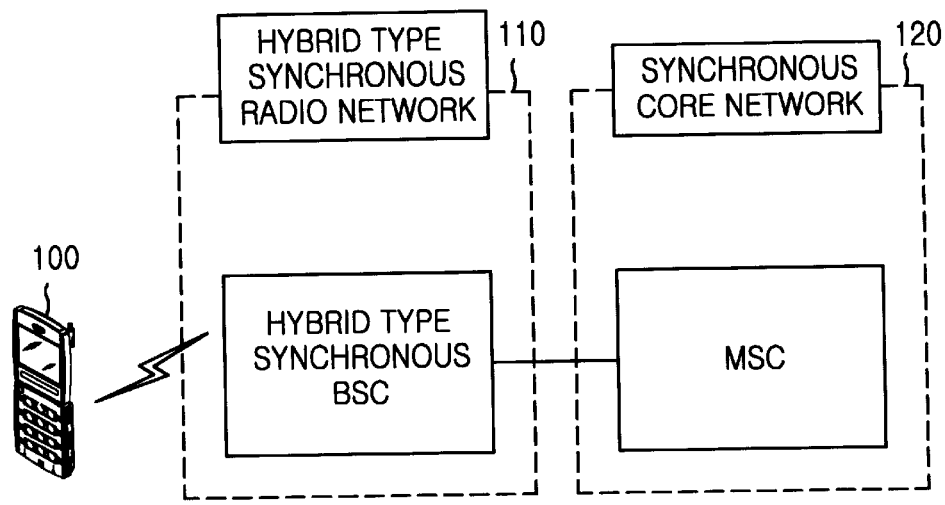
FIG. 3A is a view showing a synchronous ANSI-41 core network interface architecture of hybrid type synchronous mobile station and radio network.
Figure 3B:
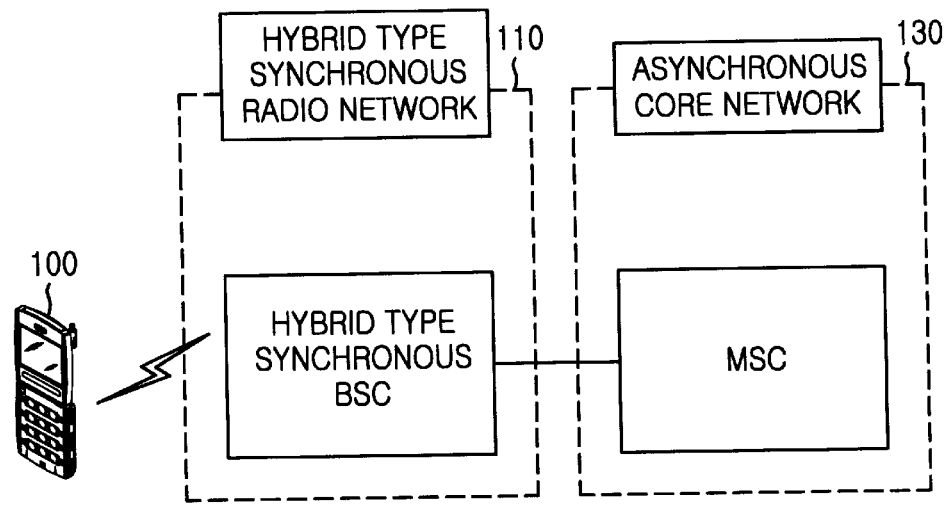
FIG. 3B is a view showing an asynchronous GSM-MAP core network interface architecture of hybrid type synchronous mobile station and radio network.
Figure 3C:
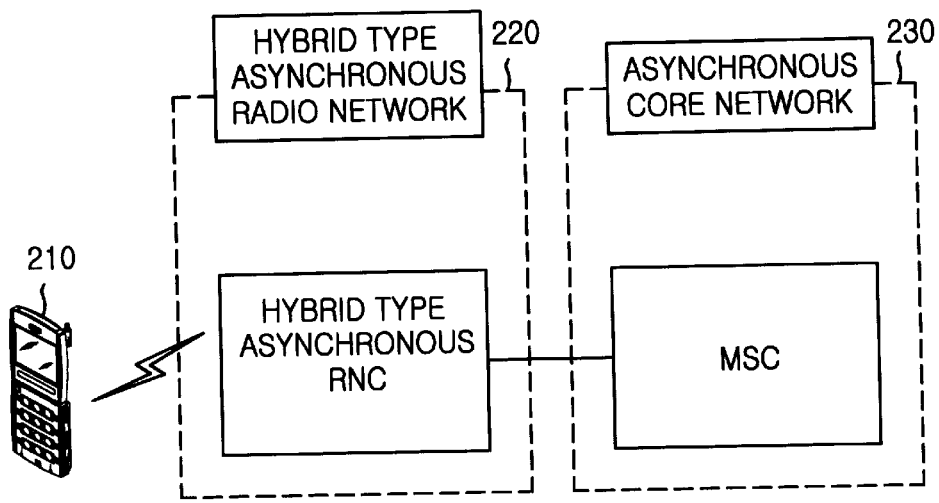
FIG. 3C is a view showing an asynchronous GSM-MAP core network interface architecture of hybrid type asynchronous mobile station and radio network.
Figure 3D:
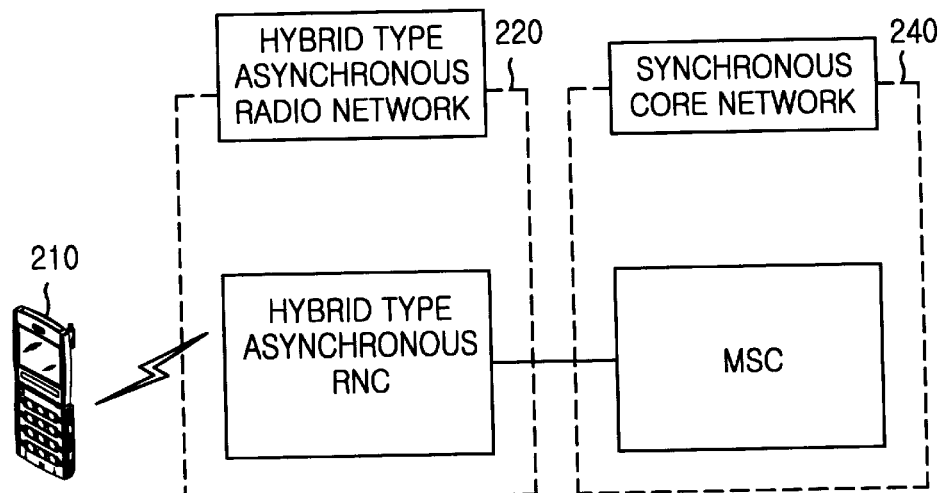
FIG. 3D is a view showing a synchronous ANSI-41 core network interface architecture of hybrid type asynchronous mobile station and radio network.
Figure 4D:
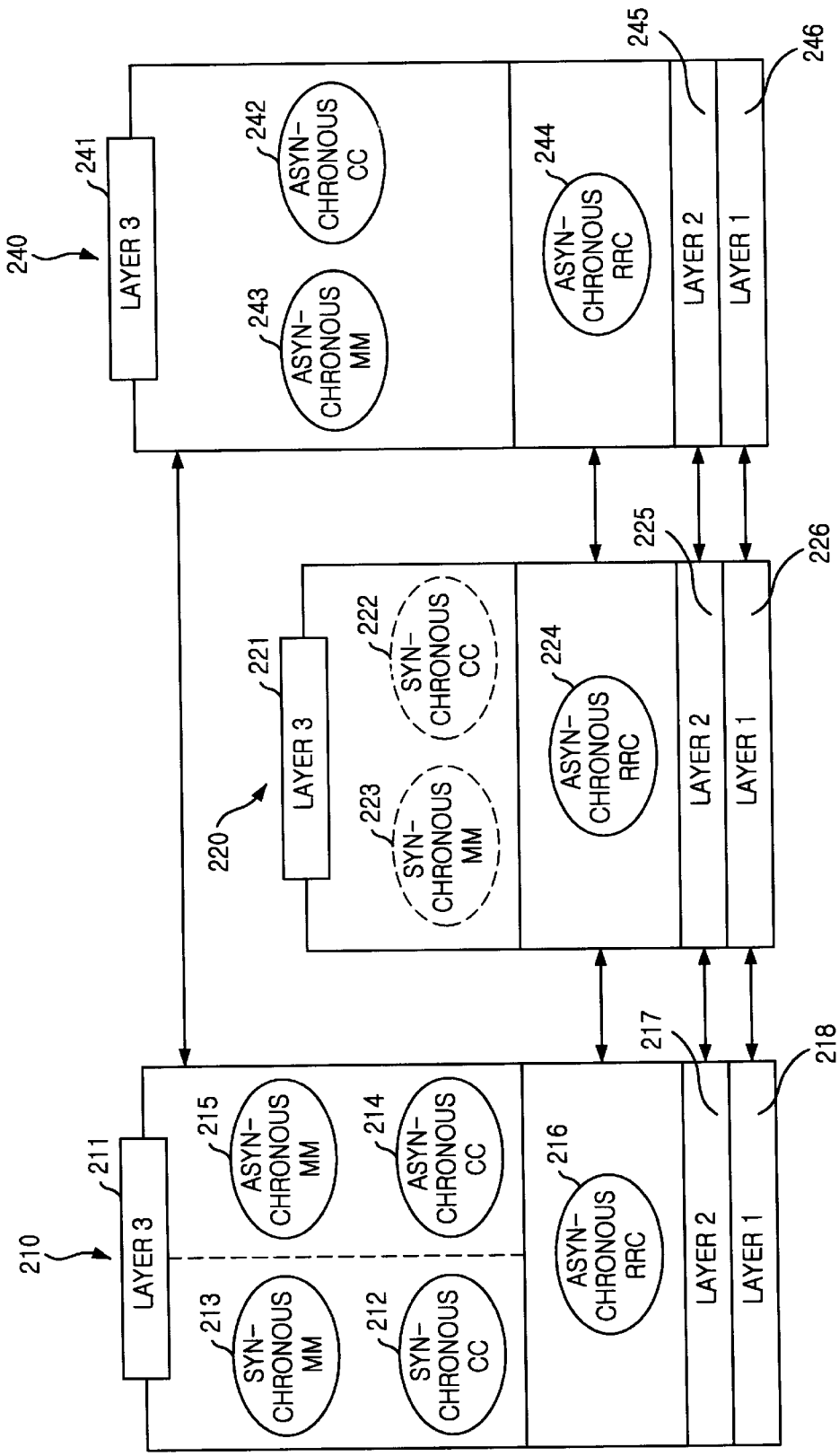
FIG. 4D is a view showing layered protocol structures of hybrid type asynchronous mobile station and radio network and the asynchronous GSM-MAP core network.

Hereinafter, the preferred embodiments of the present invention will be described in detail with reference to the accompanying drawings.

In the conventional RRC message, Information fields related to a type of a core network are changed and provided to the mobile station. Accordingly, the asynchronous mobile station can be interfaced with the core network regardless of the type of the core network.

The RRC messages and the information elements included in the RRC messages, which are related to the type of the core network, will be described.

1) RRC Connection Request Message

The mobile station requests a RRC connection to the radio network by using the RRC connection request message. The RRC connection request message includes information element related to an information related to a UE information, information element related to a radio bearer information, and information element related to a transport channel information and so on.

2) RRC Connection Setup Message

The RRC connection setup message is a response message to the RRC connection request message. The RRC connection setup message includes information for a RRC connection, for example, the information element related to the UE information, the information element related to the radio bearer information, the information element related to the transport channel information and the information element related to the physical channel information and so on.

3) RRC Connection Re-establishment Request Message

The RRC connection re-establishment message is a response message to the RRC connection re-establishment request message. The RRC connection re-establishment message includes information for a RRC connection re-establishment, for example, the information element related to the UE information, the information element related to the transport channel information, an information element related to core network information and the information element related to the physical channel information and so on.

4) UE Capability Information Message

The UE capability information message is a message used for transmitting a capability of the UE to the radio network. The UE capability information message includes the information element related to the core network information and the information element related to the UE information and so on.

5) Direct Transfer Message

The direct transfer message is used for transmitting CC/MM protocol entity through a radio interface. The direct transfer message includes the information element related to the core network information and an information element related to measurement information for radio resource management and so on.

The direct transfer message includes three kinds of direct transfer message, i.e., an initial direct transfer message, a downlink direct transfer message and a uplink direct transfer message. The initial direct transfer message is used for transmitting the CC/MM protocol entity from the mobile station to the radio network at the first time. The downlink direct transfer message is used for the CC/MM protocol entity from the radio network to the mobile station. The uplink direct transfer message is used for transmitting the CC/MM protocol entity from the mobile station to the radio network except for the first time.

6) Paging Message

The paging message is used for transmitting paging information from the core network to the mobile station. The paging message includes the information element related to the core network information and the information element related to the UE information and so on.

7) Security Mode Control Message

The security mode control message is used for providing information related to a ciphering, for example, a start point and keys of the ciphering from the radio network to the mobile station. The security mode control message includes the information element related to the core network information, the information element related to the radio bearer information and the information element related to the UE information and so on.

8) Radio Bearer Setup Message

The radio bearer setup message is used for setting a radio bearer. The radio bearer setup message includes the information element related to the core network information, the information element related to the UE information, the information element related to the radio bearer information the information element related to the transport channel and the information element related to the physical channel information and so on.

9) Cell Update Confirm Message

The cell update confirm message is a response message to a cell update message generated by the mobile station and a message representing an acknowledgment of information related to a new cell selected by the mobile station. The cell update confirm message includes the information element related to the UE information, an information element related to a UTRAN mobility information, the information element related to the core network information and the information element related to the physical channel information and so on.

10) URA Update Confirm Message

The UTRAN registration area (URA) cell update confirm message is a response message to a URA update message transmitted by the mobile station and a message representing an acknowledgment of a new URA cell information selected by the mobile station. The URA update confirm message includes the information element related to the UE information, the information element related to the UTRAN mobility information, and the information element related to the core network information and so on.

11) RNTI Reallocation Message

The RNTI reallocation message is used for allocating a new radio network temporary identifier (RNTI) to the mobile station. The radio network discriminates the mobile station by using the RNTI. The RNTI reallocation message includes the information element related to the UE information and the information element related to the core network information and so on.

12) Active Set Update Message

The active set update message is a message representing an update of radio link information included in an active set between the mobile station and the radio network. The active set update message includes the information element related to the UE information and the information element related to the physical channel information and so on.

13) Handover Command Message

The handover command message is a message used for commanding the mobile station to start a handover. The handover command message includes the information element related to the UE information, the information element related to the core network information and the information element related to the physical channel information and so on.

14) Inter-system Handover Command Message

The inter-system handover command message is a message used for commanding the mobile station to start a handover from UTRAN to another radio system, i.e. GSM radio system or TIA/EIA/IS2000 radio system. The inter-system handover command message includes the information element related to the UE information and so on.

15) Inter-system Handover Failure Message

The inter-system handover failure message is a response message to the inter-system handover command message. The inter-system handover failure message represents a failure of a handover from UTRAN to another radio system (i.e. GSM radio system or TIA/EIA/IS2000 radio system) and includes the information element related to the UE information and so on.

In order to interface the asynchronous mobile station and the asynchronous radio network with the synchronous core network, information fields related to the synchronous core network, information fields necessary for the synchronous CC/MM entity and information fields related to radio resource depending on the type of the core network are added to the RRC message mentioned above. Accordingly, the asynchronous mobile station changes and transmits to the asynchronous radio network the information element which should be changed according to the type of the core network. Also, the asynchronous radio network changes and transmits to the asynchronous mobile station the information element which should be changed according to the type of the core network.

The asynchronous radio network and the asynchronous mobile station should receive and process the RRC message having the information related to the synchronous core network in a different method from the case of receiving the conventional RRC message. The method for transmitting the RRC message having the information related to the synchronous core network will be described with reference to FIGS. 5A and 5B.

Embodiment 1

Figure 5:
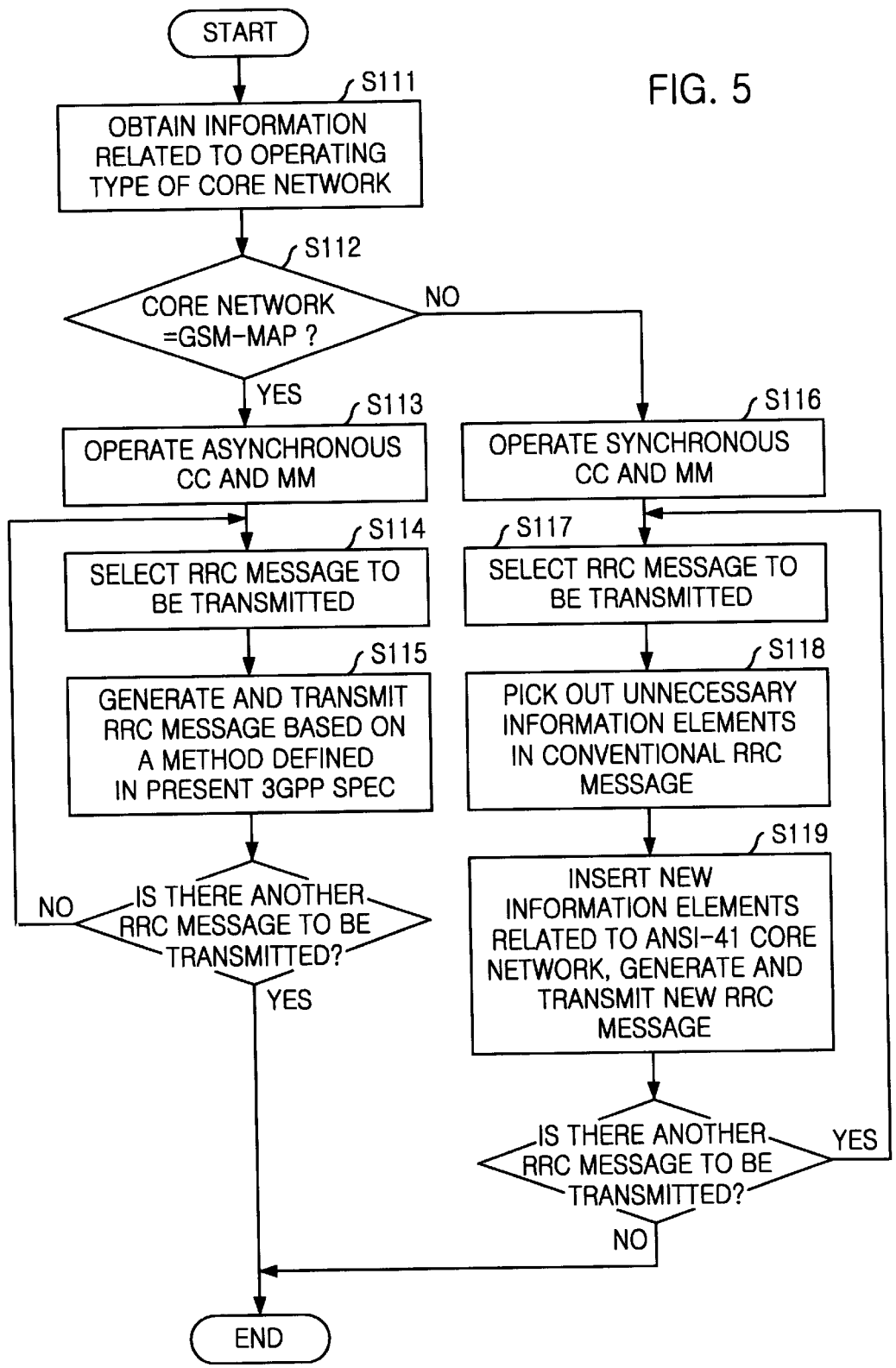
FIG. 5 is a flow chart illustrating a method for transmitting a radio resource control (RRC) message from an asynchronous mobile station to an asynchronous radio network.

FIG. 5 is a flow chart illustrating a method for transmitting a radio resource control (RRC) message from an asynchronous mobile station to an asynchronous mobile communication network.

The asynchronous mobile station receives a system information message through a broadcast control channel from the asynchronous radio network and obtains an operating type of a core network from a master system information block included in the system information message at step S111. The mobile station determines the core network is a GSM-MAP network or an ANSI-41 network based on the operating type of the core network at step S112.

If the core network is the GSM-MAP network, the mobile station operates the asynchronous CC and MM entities in the layer3 at step S113. The mobile station selects RRC messages to be transmitted to the asynchronous radio network at step S114. Then, the mobile station generates and transmits the RRC message having information related to the asynchronous core network, information necessary for operation of the asynchronous CC/MM, radio resource information related to the asynchronous core network and others information independent from the operating type of the core network in accordance with a message format defined in the present 3GPP specification at step 115.

After transmitting the RRC message, if there is another message to be transmitted, the mobile station repeats the steps S114 and S115.

If the RRC message selected by the mobile station is the RRC connection request message and the core network is the GSM-MAP network, the RRC connection request message has a data format illustrated in FIG. 7A. The format of the RRC connection request message of FIG. 7A is the same as that of the RRC connection request message used in the conventional asynchronous mobile communication system.

FIG. 7A is a diagram of a RRC connection request message when a core network is a GSM-MAP network.

In FIG. 7A, an initial UE identity information field represents an identity of a mobile station requesting a RRC connection. In case of the asynchronous CC and MM protocol entities, the initial UE identity information field is one of an international mobile subscriber identity (IMSI), an international mobile equipment identity (IMEI), a packet temporary mobile subscriber identity (P-TMSI) or a temporary mobile subscriber identity (TMSI). A RTT information field represents the operating type of the core network.

If the RRC message selected by the mobile station is the RRC connection re-establishment request message and the core network is the GSM-MAP network, the RRC connection re-establishment message has a data format illustrated in FIG. 8A. The format of the RRC connection re-establishment request message of FIG. 8A is the same as that of the RRC connection re-establishment request message used in the conventional asynchronous mobile communication system.

FIG. 8A is a diagram of a RRC connection re-establishment request message when a core network is a GSM-MAP network.

In FIG. 8A, a PLMN identity information field represents an identity of a public land mobile network (PLMN) and includes a mobile country code (MCC) and a mobile network code (MNC). A CN domain identity information field represents whether a domain of the core network (CN) is Packet domain (i.e., IP, GPRSGPRS) or Circuit domain (i.e., PSTN/ISDN). A NAS system info information field represents information in the non-access stratum (NAS) part and includes a location area code (LAC) and a routing area code (RAC). The RTT information field represents the operating type of the core network.

If the RRC message selected by the mobile station is the UE capability information message and the core network is the GSM-MAP network, the UE capability information message has a data format illustrated in FIG. 9A. The format of the UE capability information message of FIG. 9A is the same as that of the UE capability information message used in the conventional asynchronous mobile communication system.

If the RRC message selected by the mobile station is the RRC downlink direct transfer message and the core network is the GSM-MAP network, the RRC downlink direct transfer message has a data format illustrated in FIG. 10A. The format of the RRC downlink direct transfer message of FIG. 10A is the same as that of the RRC downlink direct transfer message used in the conventional asynchronous mobile communication system.

If the RRC message selected by the mobile station is the initial direct transfer message and the core network is the GSM-MAP network, the initial direct transfer message has a data format illustrated in FIG. 11A. The format of the initial direct transfer message of FIG. 11A is the same as that of the initial direct transfer message used in the conventional asynchronous mobile communication system.

If the RRC message selected by the mobile station is the inter-system handover failure message and the core network is the GSM-MAP network, the inter-system handover failure message has a data format illustrated in FIG. 12A. The format of the inter-system handover failure message of FIG. 12A is the same as that of the inter-system handover failure message used in the conventional asynchronous mobile communication system.

Referring to FIG. 12A, a system type information field includes information representing a type and a version of a system. A message information field includes information used for the system specified in the system type information field. The RTT information field represents the operating type of the core network.

Referring to FIG. 5 again, if the core network is the ANSI-41 network, the mobile station operates the synchronous CC and MM entities in the layer3 at step S116. The mobile station selects RRC messages to be transmitted to the asynchronous radio network at step S117. The mobile station picks out unnecessary information elements in the asynchronous RRC message at step 118.

The mobile station generates a new RRC message by inserting new information elements related to the synchronous core network, e.g., the ANSI-41 network, instead of the extracted information elements at step 119. The mobile station transmits the new RRC message to the radio network. Then, if there is another RRC message to be transmitted, the mobile station repeats the steps 116 to 119. The new RRC message includes information related to the ANSI-41 core network, information necessary for operating the synchronous CC/MM protocol entity, radio resource information related to the synchronous core network and the information independent from the operating type of the core network.

If the RRC message selected by the mobile station is the RRC connection request message and the core network is the ANSI-41 network, information fields related to the ANSI-41 network are newly defined and included in the information element related to the UE information so that the synchronous CC/MM entities can be operated in normal. In this case, the RRC connection request message has a data format illustrated in FIG. 7B.

FIG. 7B is a diagram of a RRC connection request message when a core network is an ANSI-41 network.

In FIG. 7B, an initial UE identity information field represents an identity of a mobile station requesting a RRC connection. In case of the synchronous CC and MM protocol entities, the initial UE identity information field is one of an international mobile subscriber identity (IMSI), a temporary mobile subscriber identity (TMSI) or an electronic serial number (ESN). The RTT information field represents the operating type of the core network. The other elements except for two information elements described above are the same as those of the asynchronous RRC connection request message.

If the RRC message selected by the mobile station is the RRC connection re-establishment request message and the core network is the ANSI-41 network, information fields related to the ANSI-41 network are newly defined and included in the information element related to the UE information so that the synchronous CC/MM entities can be operated in normal. In this case, the RRC connection re-establishment request message has a data format illustrated in FIG. 8B.

FIG. 8B is a diagram of a RRC connection re-establishment request message when a core network is an ANSI-41 network.

In FIG. 8B, CN information elements include a network identification (NID) information field, a system identification (SID) information field, a protocol revision level (P_REV) information field, a minimum protocol revision level (MIN_P_REV) information field and a circuit bearer identifier.

The NID information field represents an identifier used for discriminating a network in IMT-2000 communication system. The SID information field represents an identifier used for discriminating an IMT-2000 communication system. The P_REV information field represents a protocol revision level of the system. A protocol revision level of the mobile station is represented as MOB_P_REV. The mobile station should have the P_REV information of the system communicating with itself. The MIN_P_REV represents a minimum protocol revision level necessary for the mobile station to access the system. In other words, if MOB_P_REV is larger than or equal to MIN_P_REV, the mobile station can access the system. On the contrary, if MOB_P_REV is smaller than MIN_P_REV, the mobile station cannot access the system.

The circuit bearer identifier information field represents a bearer circuit identification between the radio network and the core network. The RTT information field represents the operating type of the core network. The other elements except for two information elements described above are the same as those of the asynchronous RRC connection request message.

If the RRC message selected by the mobile station is the RRC UE capability information message and the core network is the ANSI-41 network, information fields related to the ANSI-41 network are newly defined and included so that the synchronous CC/MM entities can be operated in normal. In this case, the RRC UE capability message has a data format illustrated in FIG. 9B.

FIG. 9B is a diagram of a RRC UE capability information message when a core network is an ANSI-41 network.

In FIG. 9B, CN information elements include a network identification (NID) information field, a system identification (SID) information field, a protocol revision level (P_REV) information field, a minimum protocol revision level (MIN_P_REV) information field and a circuit bearer identifier. The other elements except for two information elements described above are the same as those of the asynchronous RRC UE capability message.

If the RRC message selected by the mobile station is the RRC downlink direct transfer message and the core network is the ANSI-41 network, information fields related to the ANSI-41 network are newly defined and included so that the synchronous CC/MM entities can be operated in normal. In this case, the RRC downlink direct transfer message has a data format illustrated in FIG. 10B.

FIG. 10B is a diagram of a RRC downlink direct transfer message when a core network is an ANSI-41 network.

In FIG. 10B, CN information elements include a network identification (NID) information field, a system identification (SID) information field, a protocol revision level (P_REV) information field, a minimum protocol revision level (MIN_P_REV) information field and a circuit bearer identifier. The other elements except for two information elements described above are the same as those of the asynchronous RRC direct transfer message.

If the RRC message selected by the mobile station is the RRC initial direct transfer message and the core network is the ANSI-41 network, information fields related to the ANSI-41 network are newly defined and included so that the synchronous CC/MM entities can be operated in normal. In this case, the RRC initial direct transfer message has a data format illustrated in FIG. 11B.

FIG. 11B is a diagram of a RRC initial direct transfer message when a core network is an ANSI-41 network.

In FIG. 11B, CN information elements include a network identification (NID) information field, a system identification (SID) information field, a protocol revision level (P_REV) information field, a minimum protocol revision level (MIN_P_REV) information field and a circuit bearer identifier. The other elements except for two information elements described above are the same as those of the asynchronous RRC direct transfer message.

If the RRC message selected by the mobile station is the RRC inter-system handover failure message and the core network is the ANSI-41 network, information fields related to the ANSI-41 network are newly defined and included so that the synchronous CC/MM entities can be operated in normal. In this case, the RRC inter-system handover failure message has a data format illustrated in FIG. 12B.

FIG. 12B is a diagram of a RRC inter-system handover failure message when a core network is an ANSI-41 network;

In FIG. 12B, the other information element includes a system type information field and a message information field necessary for an inter-system handoff. The other elements except for two information elements described above are the same as those of the asynchronous inter-system handover failure message.

In FIG. 12B, the message information element includes parameters of a general handoff direction message and information necessary for synchronization with a TIA/EIA/IS2000 system. The message information element is encoded by an encoding method used for the synchronous system and transmitted to the asynchronous mobile station. Fields included in the message information element are illustrated in FIGS. 12C to 12G.

FIGS. 12C to 12G are diagrams illustrating contents of a message field included in the RRC inter-system handover failure message of FIG. 12B.

Figure 6:
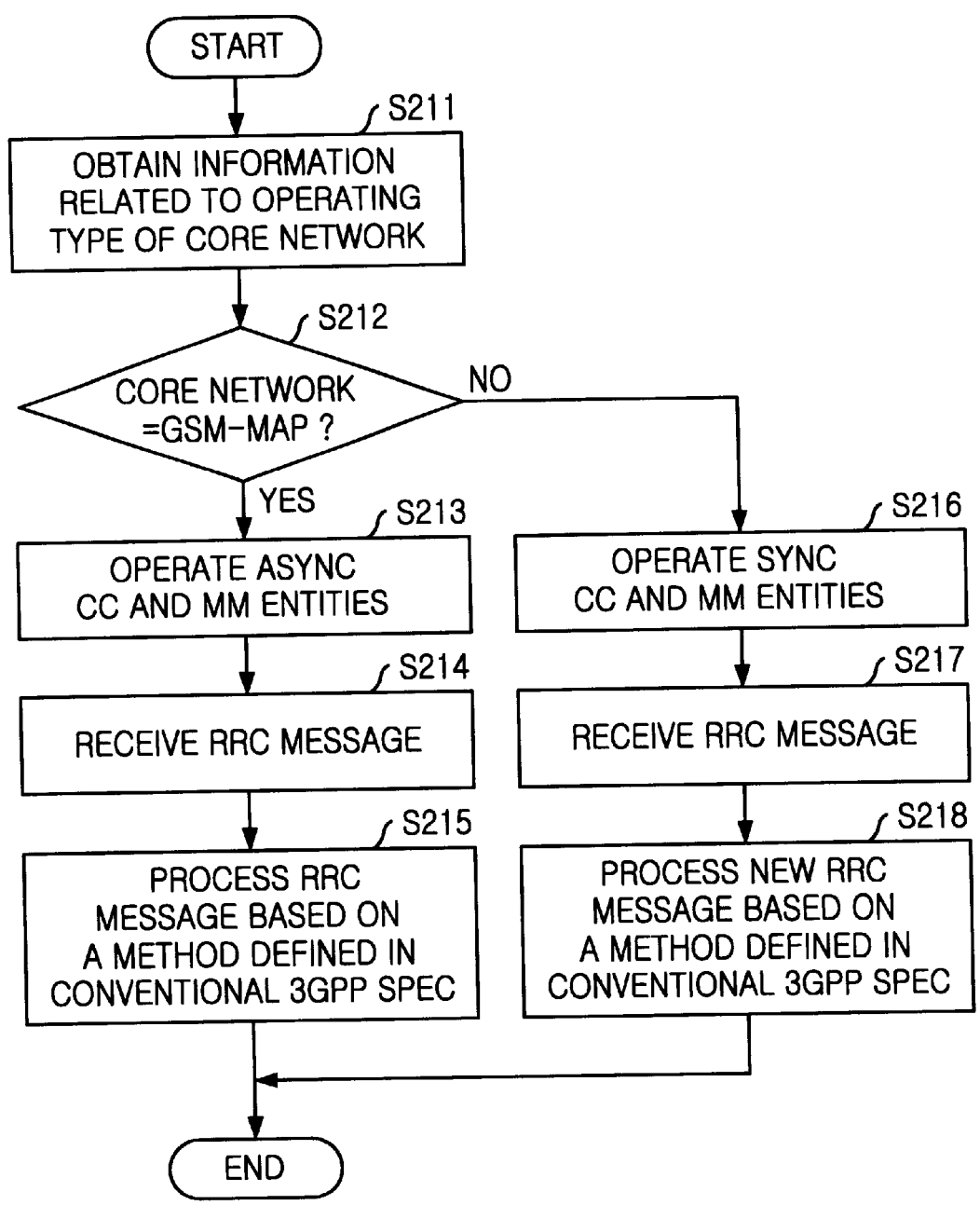
FIG. 6 is a flow chart illustrating a method for receiving a radio resource control message (RRC) from an asynchronous radio network.

In order to interface the asynchronous mobile station and the asynchronous radio network with the synchronous or the asynchronous core network, the asynchronous mobile station receives and processes a message from the asynchronous radio network. A method for processing the message from the radio network is illustrated in FIG. 6.

The asynchronous mobile station receives a system information message from the asynchronous radio network at step S211. The mobile station detects a master system information block and obtains information related to an operating type of a core network.

The mobile station determines whether the core network is the GSM-MAP network or the ANSI-41 network at step S212. The mobile station operates the asynchronous CC and MM protocol entities in the layer3 at step S213. The mobile station receives a RRC message from the asynchronous radio network at step 214. The RRC message received from the asynchronous radio network includes information fields related to the GSM-MAP core network, information fields necessary for the asynchronous CC and MM protocol entities to be operated in normal, information fields related to the radio resource dependence on the GSM-MAP core network, and information fields related to the radio resource independence on the operating type of core network and so on.

The mobile station process the RRC message in accordance with a method defined in the present 3GPP specification at step S215. In more detail, the mobile station transmits the information fields related to the GSM-MAP core network and the information fields necessary for the asynchronous CC/MM protocol entity to the asynchronous CC/MM protocol entity, stores in the RRC protocol sub layer the information fields related to the radio resource dependant on the GSM-MAP core network and the information fields related to the radio resource independent from the operating type of the core network and uses the stored information fields for establishing the radio resource.

If the core network is the ANSI-41 network, the mobile station operates the synchronous CC and MM entities in the layer3 at step S216. The mobile station receives a new RRC message having a different format from that of the asynchronous message, from the asynchronous radio network at step S217. The RRC message received from the asynchronous radio network includes information fields related to the ANSI-41 core network, information fields necessary for the synchronous CC and MM protocol entities to be operated in normal, information fields related to the radio resource dependence on the ANSI-41 core network, and information fields related to the radio resource independence on the operating type of core network and so on.

The mobile station processes the new RRC message in accordance with the conventional asynchronous RRC message at step S218. In more detail, the mobile station transmits the information fields related to the GSM-MAP core network and the information fields necessary for the asynchronous CC/MM protocol entity to the asynchronous CC/MM protocol entity, stores in the RRC protocol sub layer the information fields related to the radio resource dependant on the GSM-MAP core network and the information fields related to the radio resource independent from the operating type of the core network and uses the stored information fields for establishing the radio resource.

In IMT-2000 system, an asynchronous mobile station and radio network are coupled to a synchronous or an asynchronous core network. Accordingly, the asynchronous radio network transmits a different RRC message to the asynchronous mobile station according to the operating type of the core network.

Figure 13:
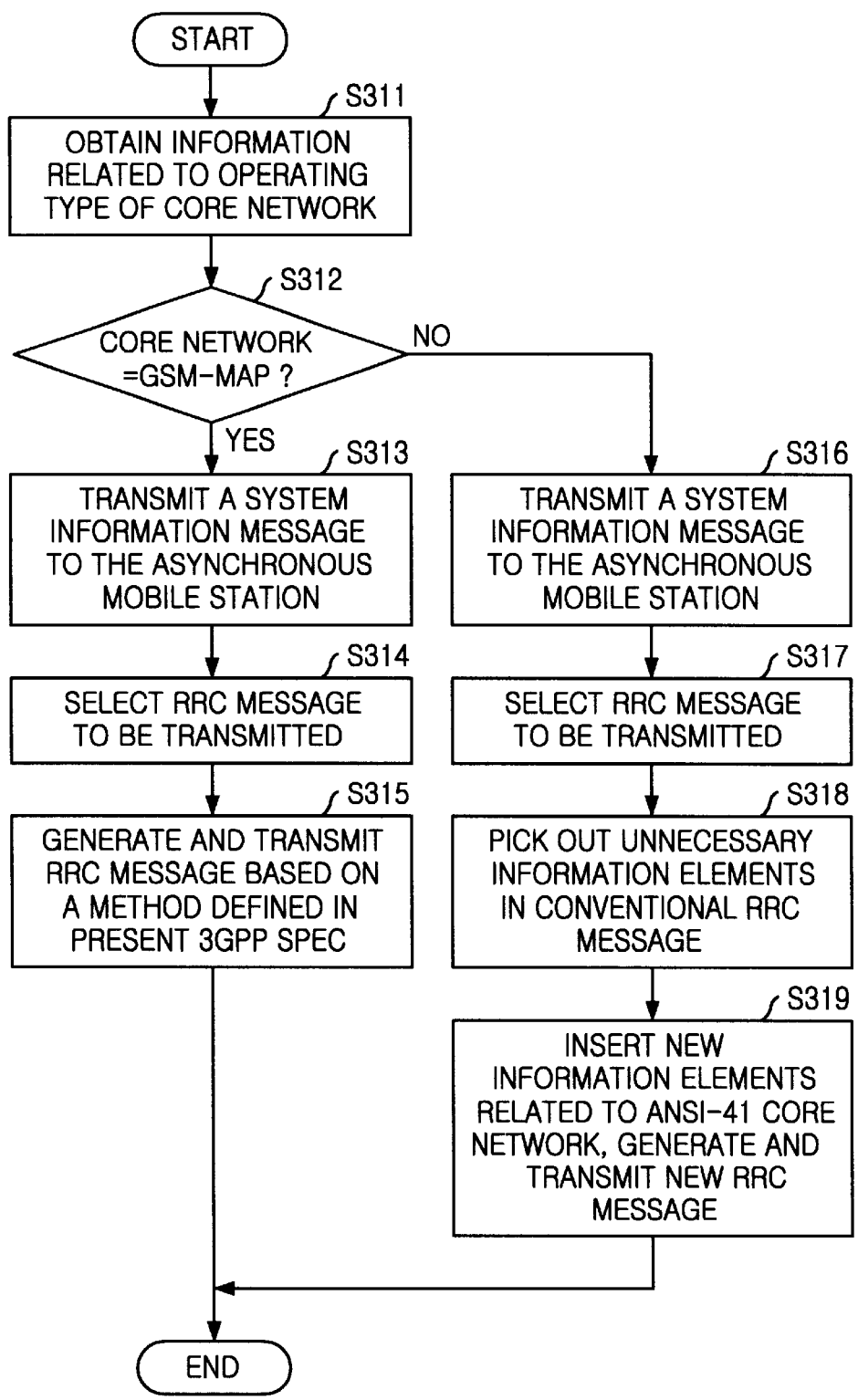
FIG. 13 is a flow chart showing a method for transmitting a RRC message from an asynchronous radio network to an asynchronous mobile station.

FIG. 13 is a flow chart showing a method for transmitting a RRC message from an asynchronous radio network to an asynchronous mobile station.

The asynchronous radio network receives information related to a core network through a data communication with the core network or hardware, for example, a dip switch at step S311. The asynchronous radio network determines whether the core network is the GSM-MAP or the ANSI-41 network at step S312.

If the core network is the GSM-MAP network, the asynchronous radio network transmits a system information message to the asynchronous mobile station at step S313. The asynchronous radio network selects a RRC message to be transmitted to the asynchronous mobile station at step S314. Then, the asynchronous radio network generates and transmits a RRC message having information related to the asynchronous core network, information necessary for operation of the asynchronous CC/MM, radio resource information related to the asynchronous core network and others information independent from the operating type of the core network in accordance with a message format defined in the present 3GPP specification at step S315.

If the RRC message selected by the radio network is the RRC connection setup message and the core network is the GSM-MAP network, the RRC connection setup message has a data format illustrated in FIG. 15A. The format of the RRC connection request message of FIG. 15A is the same as that of the RRC connection setup message used in the conventional asynchronous mobile communication system.

FIG. 15A is a diagram of a RRC connection setup message when a core network is a GSM-MAP network.

In FIG. 15A, an initial UE identity information field represents an identity of a mobile station requesting a RRC connection. In case of the asynchronous CC and MM protocol entities, the initial UE identity information field is one of an international mobile subscriber identity (IMSI), an international mobile equipment identity (IMEI), a packet temporary mobile subscriber identity (P-TMSI) or a temporary mobile subscriber identity (TMSI). A RTT information field represents the operating type of the core network.

If the RRC message selected by the radio network is the RRC paging message and the core network is the GSM-MAP network, the RRC paging message has a data format illustrated in FIG. 16A. The format of the RRC paging message of FIG. 16A is the same as that of the RRC paging message used in the conventional asynchronous mobile communication system.

FIG. 16A is a diagram of a RRC paging message when a core network is a GSM-MAP network.

In FIG. 16A, a CN domain identity information field represents whether a domain of the core network (CN) is Packet domain (i.e., Internet Protocol (IP), General Packet Radio Service (GPRS)) or Circuit domain (i.e., Public Switched Telephone network/Integrated Services Digital Network (PSTN/ISDN)). A paging record type identifier information field represents an identity of a mobile station requesting a RRC connection. In case of the asynchronous CC and MM protocol entities, the paging record type identifier information field is one of IMSI, TMSI or P-TMSI. The RTT information field represents the operating type of the core network.

If the RRC message selected by the radio network is a RRC security mode control message and the core network is the GSM-MAP network, the RRC security mode control message has a data format illustrated in FIG. 17A. The format of the RRC security mode control message of FIG. 17A is the same as that of the RRC security mode control message used in the conventional asynchronous mobile communication system.

FIG. 17A is a diagram of a RRC security mode control message when a core network is a GSM-MAP network.

In FIG. 17A, the CN domain identity information field represents whether a domain of the core network (CN) is Packet domain (i.e., IP, GPRS) or Circuit domain (i.e., PSTN/ISDN). The RTT information field represents the operating type of the core network.

If the RRC message selected by the radio network is a radio bearer setup message and the core network is the GSM-MAP network, the radio bearer setup message has a data format illustrated in FIG. 18A. The format of the radio bearer setup message of FIG. 18A is the same as that of the radio bearer setup message used in the conventional asynchronous mobile communication system.

FIG. 18A is a diagram of a RRC radio bearer setup message when a core network is a GSM-MAP network.

In FIG. 18A, the CN domain identity information field represents whether a domain of the core network (CN) is Packet domain (i.e., IP, GPRS) or Circuit domain (i.e., PSTN/ISDN). A NAS system info information field represents information in the non-access stratum (NAS) part and includes a location area code (LAC) and a routing area code (PAC). The RTT information field represents the operating type of the core network.

If the RRC message selected by the radio network is a RRC cell update confirm message and the core network is the GSM-MAP network, the RRC cell update confirm message has a data format illustrated in FIG. 19A. The format of the RRC cell update confirm message of FIG. 19A is the same as that of the RRC cell update confirm message used in the conventional asynchronous mobile communication system.

FIG. 19A is a diagram of a RRC cell update confirm message when a core network is a GSM-MAP network.

In FIG. 19A, a PLMN identity information field represents an identity of a public land mobile network (PLMN) and includes a mobile country code (MCC) and a mobile network code (MNC). The CN domain identity information field represents whether a domain of the core network (CN) is Packet domain (i.e., IP, GPRS) or Circuit domain (i.e., PSTN/ISDN). A NAS system info information field represents information in the non-access stratum (NAS) part and includes a location area code (LAC) and a routing area code (RAC). The RTT information field represents the operating type of the core network.

If the RRC message selected by the radio network is a RRC URA update confirm message and the core network is the GSM-MAP network, the RRC URA update confirm message has a data format illustrated in FIG. 20A. The format of the RRC URA update confirm message of FIG. 20A is the same as that of the RRC URA update confirm message used in the conventional asynchronous mobile communication system.

FIG. 20A is a diagram of a RRC URA update confirm message when a core network is a GSM-MAP network.

If the RRC message selected by the radio network is a RRC RNTI reallocation message and the core network is the GSM-MAP network, the RRC RNTI reallocation message has a data format illustrated in FIG. 21A. The format of the RRC RNTI reallocation message of FIG. 21A is the same as that of the RRC RNTI reallocation message used in the conventional asynchronous mobile communication system.

FIG. 21A is a diagram of a RRC RNTI reallocation message when a core network is a GSM-MAP network.

In FIG. 21A, a PLMN identity information field represents an identity of a public land mobile network (PLMN) and includes a mobile country code (MCC) and a mobile network code (MNC). The CN domain identity information field represents whether a domain of the core network (CN) is Packet domain (i.e., IP, GPRS) or Circuit domain (i.e., PSTN/ISDN). A NAS system info information field represents information in the non-access stratum (NAS) part and includes a location area code (LAC) and a routing area code (RAC). The RTT information field represents the operating type of the core network.

If the RRC message selected by the radio network is a RRC active set update message and the core network is the GSM-MAP network, the RRC active set update message has a data format illustrated in FIG. 22A. The format of the RRC active set update message of FIG. 22A is the same as that of the RRC active set update message used in the conventional asynchronous mobile communication system.

FIG. 22A is a diagram of a RRC active set update message when a core network is a GSM-MAP network.

In FIG. 22A, a PLMN identity information field represents an identity of a public land mobile network (PLMN) and includes a mobile country code (MCC) and a mobile network code (MNC). The CN domain identity information field represents whether a domain of the core network (CN) is Packet domain (i.e., IP, GPRS) or Circuit domain (i.e., PSTN/ISDN). A NAS system info information field represents information in the non-access stratum (NAS) part and includes a location area code (LAC) and a routing area code (RAC). The RTT information field represents the operating type of the core network.

If the RRC message selected by the radio network is a RRC handover command message and the core network is the GSM-MAP network, the RRC handover command message has a data format illustrated in FIG. 23A. The format of the RRC handover command message of FIG. 23A is the same as that of the RRC handover command message used in the conventional asynchronous mobile communication system.

FIG. 23A is a diagram of a RRC handover command message when a core network is a GSM-MAP network.

In FIG. 23A, a PLMN identity information field represents an identity of a public land mobile network (PLMN) and includes a mobile country code (MCC) and a mobile network code (MNC). The CN domain identity information field represents whether a domain of the core network (CN) is Packet domain (i.e., IP, GPRS) or Circuit domain (i.e., PSTN/ISDN). A NAS system info information field represents information in the non-access stratum (NAS) part and includes a location area code (LAC) and a routing area code (RAC). The RTT information field represents the operating type of the core network.

If the RRC message selected by the radio network is a RRC inter-system handover command message and the core network is the GSM-MAP network, the RRC inter-system handover command message has a data format illustrated in FIG. 23A. The format of the RRC inter-system handover command message of FIG. 23A is the same as that of the RRC inter-system handover command message used in the conventional asynchronous mobile communication system.

FIG. 24A is a diagram of a RRC inter-system handover command message when a core network is a GSM-MAP network. In FIG. 24A, a system type information field includes information representing a type and a version of a system. A message information field includes information used for the system specified in the system type information field. The RTT information field represents the operating type of the core network.

Referring to FIG. 13 again, if the core network is the ANSI-41 network, the radio network transmits a system information message having information related to the synchronous core network to the mobile station at step S316. The radio network selects a RRC message to be transmitted to the mobile station at step 317. The radio network picks out unnecessary information elements in the asynchronous RRC message at step 318.

The radio network generates a new RRC message by inserting new information elements related to the synchronous core network, e.g., the ANSI-41 network, instead of the extracted information elements at step 319. The radio network transmits the new RRC message to the mobile station. Then, if there is another RRC message to be transmitted, the mobile station repeats the steps 317 to 319. In more detail, the new RRC message includes the information related to the ANSI-41 synchronous core network, the information necessary for operating the CC/MM protocol entity, radio resource information dependent on the ANSI-41 synchronous core network and information independent from the operating type of the core network.

If the RRC message selected by the mobile station is the RRC connection setup message and the core network is the ANSI-41 network, information fields related to the ANSI-41 network are newly defined and included in the information element related to the UE information so that the synchronous CC/MM entities can be operated in normal. In this case, the RRC connection setup message has a data format illustrated in FIG. 15B.

FIG. 15B is a diagram of a RRC connection setup message when a core network is an ANSI-41 network.

In FIG. 15B, an initial UE identity information field represents an identity of a mobile station requesting a RRC connection. In case of the synchronous CC and MM protocol entities, the initial UE identity information field is one of an international mobile subscriber identity (IMSI), a temporary mobile subscriber identity (TMSI) or an electronic serial number (ESN). The RTT information field represents the operating type of the core network. The other elements except for two information elements described above are the same as those of the asynchronous RRC connection request message.

If the RRC message selected by the radio network is the RRC paging message and the core network is the ANSI-41 network, information fields related to the core network are newly defined and included so that the synchronous CC/MM entities can be operated in normal. The information fields related to the core network includes a network identification (NID), a system identification (SID) and a paging record in accordance with the ANSI-41 core network. In this case, the RRC paging message has a data format illustrated in FIG. 16B.

FIG. 16B is a diagram of a RRC paging message when a core network is an ANSI-41 network.

In FIG. 16B, CN information elements include the NID information field, the SID information field, the protocol revision level (P_REV) information field, a minimum protocol revision level (MIN_P_REV) information field and a paging record type identifier information field.

The NID information field represents an identifier used for discriminating a network in IMT-2000 communication system. The SID information field represents an identifier used for discriminating an IMT-2000 communication system.

The P_REV information field represents a protocol revision level of the system. A protocol revision level of the mobile station is represented as MOB_P_REV. The mobile station should have the P_REV information of the system communicating with itself. The MIN_P_REV represents a minimum protocol revision level necessary for the mobile station to access the system. In other words, if MOB_P_REV is larger than or equal to MIN_P_REV, the mobile station can access the system. On the contrary, if MOB_P_REV is smaller than MIN_P_REV, the mobile station cannot access the system.

The paging record type identifier information field represents an identification of a mobile station requesting a call connection. One of IMSI, TMSI or ESN is selected as the paging record type identifier. The RTT information field represents the operating type of the core network. The other elements except for two information elements described above are the same as those of the asynchronous RRC connection request message.

If the RRC message selected by the radio network is the RRC security mode control message and the core network is the ANSI-41 network, information fields related to the ANSI-41 network are newly defined and included so that the synchronous CC/MM entities can be operated in normal. In this case, the RRC secure mode control message has a data format illustrated in FIG. 17B.

FIG. 17B is a diagram of a RRC security mode control message when a core network is an ANSI-41 network.

In FIG. 17B, CN information elements include the NID information field, the SID information field, the P_REV information field and a MIN_P_REV information field. The RTT information field represents the operating type of the core network.

If the RRC message selected by the radio network is the RRC radio bearer setup message and the core network is the ANSI-41 network, information fields related to the ANSI-41 network are newly defined and included so that the synchronous CC/MM entities can be operated in normal. In this case, the RRC radio bearer setup message has a data format illustrated in FIG. 18B.

FIG. 18B is a diagram of a RRC radio bearer setup message when a core network is an ANSI-41 network.

In FIG. 18B, CN information elements include the NID information field, the SID information field, the P_REV information field, the MIN_P_REV information field and a NAS Binding Info information field. The RTT information field represents the operating type of the core network.

The circuit bearer identifier information field represents a bearer circuit identification between the radio network and the core network. The RTT information field represents the operating type of the core network. The other elements except for the information elements described above are the same as those of the asynchronous RRC radio bearer setup message.

If the RRC message selected by the radio network is the RRC cell update confirm message and the core network is the ANSI-41 network, information fields related to the ANSI-41 network are newly defined and included so that the synchronous CC/MM entities can be operated in normal. In this case, the RRC cell update confirm message has a data format illustrated in FIG. 19B.

FIG. 19B is a diagram of a RRC cell update confirm message when a core network is an ANSI-41 network.

In FIG. 19B, CN information elements include the NID information field, the SID information field, the P_REV information field, the MIN_P_REV information field. The other elements except for the information elements described above are the same as those of the asynchronous RRC cell update confirm message.

If the RRC message selected by the radio network is the RRC URA update confirm message and the core network is the ANSI-41 network, information fields related to the ANSI-41 network are newly defined and included so that the synchronous CC/MM entities can be operated in normal. In this case, the RRC URA update confirm message has a data format illustrated in FIG. 20B.

FIG. 20B is a diagram of a RRC URA update confirm message when a core network is an ANSI-41 network.

In FIG. 20B, CN information elements include the NID information field, the SID information field, the P_REV information field, the MIN_P_REV information field. The other elements except for the information elements described above are the same as those of the asynchronous RRC URA update confirm message.

If the RRC message selected by the radio network is the RRC RNTI update confirm message and the core network is the ANSI-41 network, information fields related to the ANSI-41 network are newly defined and included so that the synchronous CC/MM entities can be operated in normal. In this case, the RRC RNTI update confirm message has a data format illustrated in FIG. 21B.

FIG. 21B is a diagram of a RRC RNTI reallocation message when a core network is an ANSI-41 network.

In FIG. 21B, CN information elements include the NID information field, the SID information field, the P_REV information field, the MIN_P_REV information field. The other elements except for the information elements described above are the same as those of the asynchronous RRC RNTI update confirm message.

If the RRC message selected by the radio network is the RRC active set update confirm message and the core network is the ANSI-41 network, information fields related to the ANSI-41 network are newly defined and included so that the synchronous CC/MM entities can be operated in normal. In this case, the RRC active set update confirm message has a data format illustrated in FIG. 22B.

FIG. 22B is a diagram of a RRC active set update message when a core network is an ANSI-41 network.

In FIG. 22B, CN information elements include the NID information field, the SID information field, the P_REV information field, the MIN_P_REV information field. The other elements except for the information elements described above are the same as those of the asynchronous RRC active set update confirm message.

If the RRC message selected by the radio network is the RRC handover command message and the core network is the ANSI-41 network, information fields related to the ANSI-41 network are newly defined and included so that the synchronous CC/MM entities can be operated in normal. In this case, the RRC handover command message has a data format illustrated in FIG. 23B.

FIG. 23B is a diagram of a RRC handover command message when a core network is an ANSI-41 network.

In FIG. 23B, CN information elements include the NID information field, the SID information field, the P_REV information field, the MIN_P_REV information field. The other elements except for the information elements described above are the same as those of the asynchronous RRC handover command message.

If the RRC message selected by the radio network is the RRC inter-system handover command message and the core network is the ANSI-41 network, information fields related to the ANSI-41 network are newly defined and included so that the synchronous CC/MM entities can be operated in normal. In this case, the RRC inter-system handover command message has a data format illustrated in FIG. 24B.

FIG. 24B is a diagram of a RRC inter-system handover command message when a core network is an ANSI-41 network.

In FIG. 24B, the Other information element includes a system type information field, parameters of a general handoff direction message and information necessary for synchronization with a TIA/EIA/IS2000 system. The message information element is encoded by an encoding method used for the synchronous system and transmitted to the asynchronous mobile station. Fields included in the message information field are illustrated in FIGS. 24C to 24E.

FIGS. 24C to 24E are diagrams illustrating contents of fields included in the RRC inter-system handover command message of FIG. 24B.

The RRC inter-system handover command message includes the same kinds of information fields as that of the RRC inter-system handover failure message.

The radio network receives and processes a different message from the mobile station in accordance with the operating type of the core network. A method for processing the message at the radio network is illustrated in FIG. 14.

Figure 14:
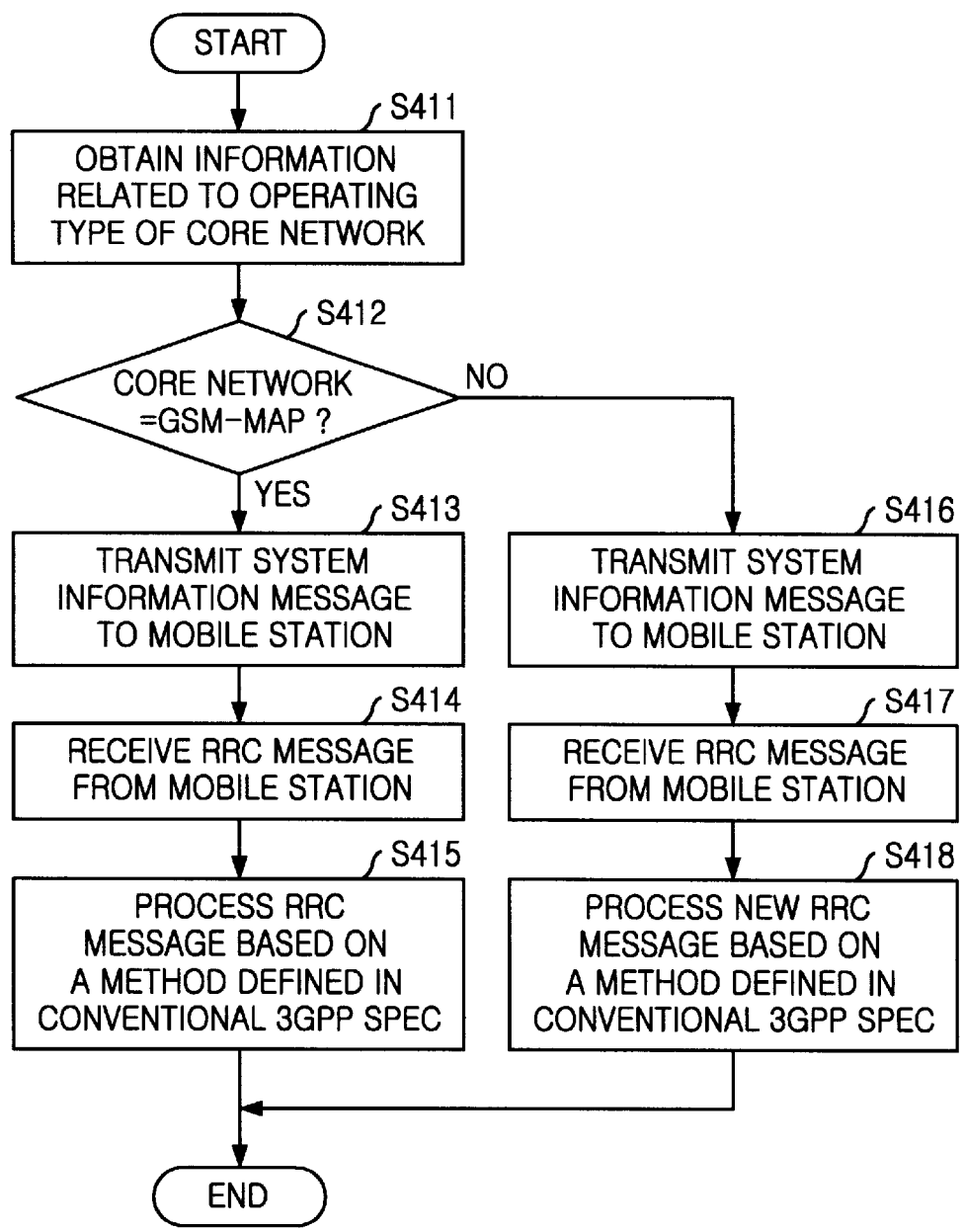
FIG. 14 is a flow chart showing a method for receiving a RRC message from an asynchronous mobile station.

FIG. 14 is a flow chart showing a method for receiving and processing a RRC message from an asynchronous mobile station.

The asynchronous radio network receives information related to a core network through a data communication with the core network or hardware, for example, a dip switch at step S411.

The radio network determines whether the core network is the GSM-MAP network or the ANSI-41 network at step S412. The radio network transmits a system information message to the mobile station at step S413. The radio network receives a RRC message from the asynchronous mobile station at step S414. The RRC message received from the asynchronous mobile station includes information fields related to the GSM-MAP core network, information fields necessary for the asynchronous CC and MM protocol entities to be operated in normal, information fields related to the radio resource dependant on the GSM-MAP core network, and information fields related to the radio resource independent from the operating type of core network and so on.

The radio network processes the RRC message in accordance with a method defined in the present 3GPP specification at step S415. In more detail, the mobile station transmits the information fields related to the GSM-MAP core network and the information fields necessary for the asynchronous CC/MM protocol entity to the asynchronous CC/MM protocol entity, stores in the RRC protocol sub layer the information fields related to the radio resource dependant on the GSM-MAP core network and the information fields related to the radio resource independent from the operating type of the core network and uses the stored information fields for establishing the radio resource.

If the core network is the ANSI-41 network, the radio network transmits a system information message to the mobile station at step S416. The radio network receives a new RRC message having a different format from that of the asynchronous message, from the asynchronous mobile station at step S417. The RRC message received from the asynchronous mobile station includes information fields related to the ANSI-41 core network, information fields necessary for the synchronous CC and MM protocol entities to be operated in normal, information fields related to the radio resource dependence on the ANSI-41 core network, and information fields related to the radio resource independence on the operating type of core network and so on.

The radio network processes the new RRC message in accordance with the conventional asynchronous RRC message at step S418. In more detail, the mobile station transmits the information fields related to the GSM-MAP core network and the information fields necessary for the asynchronous CC/MM protocol entity to the asynchronous CC/MM protocol entity, stores in the RRC protocol sub layer the information fields related to the radio resource dependant on the GSM-MAP core network and the information fields related to the radio resource independent from the operating type of the core network and uses the stored information fields for establishing the radio resource.

Using the method for transmitting a RRC message in an asynchronous mobile communication system in accordance with the present invention, though the mobile communication system is coupled to a core network having any operating type, the asynchronous mobile station and asynchronous radio network can communicate a message with each other.

Also, the method for transmitting a RRC message in an asynchronous mobile communication system permits a subscriber of the asynchronous mobile communication system to communicate with a subscriber of another communication system.

Although the preferred embodiments of the invention have been disclosed for illustrative purpose, those skilled in the art will be appreciate that various modifications, additions and substitutions are possible, without departing from the scope and spirit of the invention as disclosed in the accompanying claims.

What is claimed is:

1. A method for transmitting a radio resource message from an asynchronous mobile station to an asynchronous radio network in an asynchronous mobile communication system, the method comprising the steps of:
   a) determining whether a core network is a synchronous core network or an asynchronous core network;
   b) if the core network is the synchronous core network, generating a radio resource control message having information related to the synchronous core network; and
   c) transmitting the radio resource control message to the asynchronous radio network,
   wherein the step b) includes the steps of:
      b1) selecting a radio resource control message to be transmitted to the asynchronous radio network and generating a selected radio resource control message;

b2) picking out information fields related to the asynchronous core network, in the selected radio resource control message;

b3) inserting information fields related to the synchronous core network into the selected radio resource control message, wherein if the selected radio resource control message is a radio resource control re-establishment request message, the radio resource control re-establishment request message includes at least an information element related to a synchronous core network so that the synchronous call control/management mobility entities can be operated in normal and a RTT information field representing an operation type of the core network, and wherein the information element has a network identification (NID), a system identification (SID), a protocol revision level (P REV) and a minimum protocol revision level (MIN P REV) information fields.

2. The method as recited in claim 1, wherein the step a) includes:

a1) receiving information related to an operating type of a core network; and a2) determining whether the core network is a synchronous core network or an asynchronous core network, based on the operating type of the core network.

3. The method as recited in claim 1, wherein if the selected radio resource control message is a radio resource control connection request message, the radio resource control connection request message includes at least an initial user equipment (UE) information field so that the synchronous call control/management mobility entities can be operated in normal and a RTT information field representing an operation type of core network.

4. The method as recited in claim 3, wherein the initial UE information field has one of an international mobile subscriber identity (IMSI), a temporary mobile subscriber identity (TMSI) or an electronic serial number (ESN).

5. The method as recited in claim 1, wherein if the selected radio resource control message is a radio resource control user equipment (UE) capability information message, the radio resource control UE capability information message includes at least information element related to a synchronous core network so that the synchronous call control/management mobility entities can be operated in normal and a RTT information field representing an operation type of the core network.

6. The method as recited in claim 5, wherein the information element related to the synchronous core network has a network identification (NID), a system identification (SID), a protocol revision level (P_REV), a minimum protocol revision level (MIN_P_REV) and a non-access stratum (NAS) message.

7. The method as recited in claim 1, wherein if the selected radio resource control message is a radio resource control downlink direct transfer message, the radio resource control downlink direct transfer message includes at least information element related to a synchronous core network and a RTT information field representing an operation type of the synchronous core network so that the synchronous call control/management mobility entities can be operated in normal.

8. The method as recited in claim 7, wherein the information element related to the synchronous core network has a network identification (NID), a system identification (SID), a protocol revision level (P_REV), a minimum protocol revision level (MI_P_REV) and a non-access stratum (NAS) message.

9. The method as recited in claim 1, wherein if the selected radio resource control message is a radio resource control initial direct transfer message, the radio resource control initial direct transfer message includes at least information element related to a synchronous core network and a RTT information field representing an operation type of the synchronous core network so that the synchronous call control/management mobility entities can be operated in normal.

10. The method as recited in claim 9, wherein the information element related to the synchronous core network has a network identification (NID), a system identification (SID), a protocol revision level (P_REV), a minimum protocol revision level (MIN_P_REV) and a non-access stratum (NAS) message.

11. The method as recited in claim 1, wherein if the selected radio resource control message is a radio resource control inter-system handover failure message, the radio resource control inter-system handover failure message includes at least a system type information field and a message information field having information related to an inter-system handover.

12. The method as recited in claim 11, wherein the message information field includes: PILOT_PN, LC_STATE, SYS_TIME, CDMA_FREQ, USE_TIME, ACTION_TIME, HDM_SEQ, SEARCH_INCLUDED, SRCH_WIN_A, SRCH_WIN_N, SRCH_WIN_R, T_ADD, T_DROP, T_COMP, T_TDROP, SOFT_SLOPE, ADD_INTERCEPT, DROP_INTERCEPT, EXTRA_PARMS, P_REV, PACKET_ZONE_ID, FRAME_OFFSET, PRIVATE_LCM, RESET_L2, RESET_FPC, SERV_NEG_TYPE, ENCRYPT_MODE, NOM_PWR_XT, NOM_PWR, NUM_PREAMBLE, BAND_CLASS, CDMA_FREQ, RETURN_IF_HANDOFF_FAIL, COMPLETE_SEARCH, PERIODIC_SEARCH, SERVICE_INCLUDED, SERV_CON_SEQ, RECORD_TYPE, RECORD_LEN, Type-specific field, SUP_CHAN_PARMS_INCLUDED, FOR_INCLUDED, FOR_SUP_CONFIG, NUM_FOR_SUP, USE_FOR_DURATION, FOR_DURATION, REV_INCLUDED, REV_DTX_DURATION, CLEAR_RETRY_DELAY, USE_REV_DURATION, REV_DURATION, NUM_REV_CODES, USE_T_ADD_ABORT, REV_PARMS_INCLUDED, T_MULCHAN, BEGI_PREAMBLE, RESUME_PREAMBLE, USE_PWR_CNTL_STEP, PWR_CNTL_STEP, NUM_PILOTS, PILOT_PN, PWR_COM_IND, FOR_FUND_CODE_CHAN, FOR_SUP_INCLUDED, FOR_SUP_CHAN_REC Record, EPC_SUBCHAN_GAN, USE_PC_TIME, PC_ACTION_TIME, RLGAIN_TRAFFIC_PILOT, DEFAULT_RLAG, RECORD_TYPE, RECORD_LEN, RC_SYNC_ID_INCL, RC_SYNC_ID, BLOB_INCL AND BLOB.

13. A method for transmitting a radio resource message from an asynchronous radio network to an asynchronous mobile station in an asynchronous mobile communication system, the method comprising the steps of:

a) determining whether a core network is a synchronous core network or an asynchronous core network;

b) if the core network is the synchronous core network, generating a radio resource control message having information related to the synchronous core network; and c) transmitting the radio resource control message to the asynchronous mobile station, wherein the step b) includes the steps of:
b1) selecting a radio resource control message to be transmitted to the asynchronous mobile station and generating a selected radio resource control message;
b2) picking out information fields related to the asynchronous core network, in the selected radio resource control message; and
b3) inserting information fields related to the synchronous core network into the selected radio resource control message,
wherein if the selected radio resource control message is a radio resource control paging message, the radio resource control paging message includes at least a network identification (NID) information field, a system identification (SID) information field, a paging record type identifier information field so that the synchronous call control/management mobility entities can be operated in normal and a RTT information field representing an operation type of the core network.

14. The method as recited in claim 13, further comprising the step of:
d) providing a system information message to the asynchronous mobile station before the step b).

15. The method as recited in claim 13, wherein the step a) includes:
a1) receiving information related to an operating type of a core network; and
a2) determining whether the core network is a synchronous core network or an asynchronous core network, based on the operating type of the core network.

16. The method as recited in claim 13, wherein if the selected radio resource control message is a radio resource control connection setup message, the radio resource control connection setup message includes at least an initial user equipment (UE) information field related to synchronous core network so that the synchronous call control/management mobility entities can be operated in normal and a RTT information field representing an operation type of the core network.

17. The method as recited in claim 16, wherein the initial UE information field has one of an international mobile subscriber identity (IMSI), a temporary mobile subscriber identity (TMSI) or an electronic serial number (ESN).

18. The method as recited in claim 16, wherein the paging record type identifier has one of an international mobile subscriber identity (IMSI), a temporary mobile subscriber identity (TMSI) or an electronic serial number (ESN).

19. The method as recited in claim 13, wherein if the selected radio resource control message is a radio resource control security mode control message, the radio resource control secure mode control message includes at least a network identification (NID) information field, a system identification (SID) information field, a radio bearer identity information field so that the synchronous call control/management mobility entities can be operated in normal and a RTT information field representing an operation type of the core network.

20. The method as recited in claim 13, wherein if the selected radio resource control message is a radio resource control radio bearer setup message, the radio resource control radio bearer setup message includes at least a network identification (NID) information field, a system identification (SID) information field, a circuit bearer identifier information field so that the synchronous call control/management mobility entities can be operated in normal and a RTT information field representing an operation type of the core network.

21. The method as recited in claim 13, wherein if the selected radio resource control message is a radio resource control cell update confirm message, the cell update confirm message includes at least a network identification (NID) information field, a system identification (SID) information field and a circuit bearer identifier information field related to synchronous core network so that the synchronous call control/management mobility entities can be operated in normal and a RTT information field representing an operation type of the core network.

22. The method as recited in claim 13, wherein if the selected radio resource control message is a radio resource control UTRAN registration area (URA) update confirm message, the radio resource control UTRAN registration area update confirm message includes at least a network identification (NID) information field, a system identification (SID) information field and a circuit bearer identifier information field related to synchronous core network so that the synchronous call control/management mobility entities can be operated in normal and a RTT information field representing an operation type of the core network.

23. The method as recited in claim 13, wherein if the selected radio resource control message is a radio resource control radio network temporary identifier (RNTI) reallocation message, the radio resource control radio network temporary identifier reallocation message includes at least a network identification (NID) information field, a system identification (SID) information field, a protocol revision level (P_REV) information field and minimum a protocol revision level (MIN_P_REV) information field, a circuit bearer identifier information field related to synchronous core network so that the synchronous call control/management mobility entities can be operated in normal and a RTT information field representing an operation type of the core network.

24. The method as recited in claim 13, wherein if the selected radio resource control message is a radio resource control active set update message, the radio resource control active set update message includes at least a network identification (NID) information field, a system identification (SID) information field, a protocol revision level (P_REV) information field, a minimum protocol revision level (MIN_P_REV) information field, a circuit bearer identifier information field so that the synchronous call control/management mobility entities can be operated in normal and a RTT information field representing an operation type of the core network.

25. The method as recited in claim 13, wherein if the selected radio resource control message is a radio resource control handover command message, the radio resource control handover command message includes at least a network identification (NID) information field, a system identification (SID) information field, a protocol revision level (P_REV) information field, a minimum protocol revision level (MIN_P_REV) information field, a circuit bearer identifier information field so that the synchronous call control/management mobility entities can be operated in normal and a RTT information field representing an operation type of the core network.

26. The method as recited in claim 13, wherein if the selected radio resource control message is a radio resource control inter-system handover command message, the radio resource control inter-system handover command message includes at least a system type information field and a message information field having information related to an inter-system handover.

27. The method as recited in claim 26, wherein the message information field includes PILOT_PN, LC_STATE, SYS_TIME, CDMA_FREQ, USE_TIME, ACTION_TIME, HDM_SEQ, SEARCH_INCLUDED, SRCH_WIN_A, SRCH_WIN_N, SRCH_WIN_R, T_ADD, T_DROP, T_COMP, T_TDROP, SOFT_SLOPE, ADD_INTERCEPT, DROP_INTERCEPT, EXTRA_PARMS, R-REV, PACKET_ZINE_ID, FRAME_OFFSET, PRIVATE_LCM, RESET_L2, RESET_FPC, SERV_NEG_TYPEENCRYPT_MODE, NOM_PWPR_EXT, NOM_PWR, NUM_PREAMBLE, BAND_CLASS, CDMA_FREQ, RETURN_IF_HANDOFF_FAIL, COMPLETE_SEARCH, PERIODIC_SERACH, SERVICE_INCLUDED, SERV_CON_SEQ, RECORD_TYPE, RECORD_LEN, Type-specific fields, SUP_CHAN_PARMS_INCLUDED, FOR_INCLUDED, FOR_SUP_CONFIG, FOR_SUP_CONFIG, NUM_FOR_SUP, USE_FOR_DURATION, FOR_DURATION, REV_INCLUDED, REV_DTX_DURATION, CLEAR_RETRY_DELAY, USE_REV_DURATION, REV_DURATION, NUM_REV_CODES, USE_T_ADD_ABORT, REV_PARMS_INCLUDED, T_MULCHAN, BEGI_PREAMBLE, RESUME_PREAMBLE, USE_PWR_CONTRL_STEP, PWR_CNTL_STEP, NUM-PILOTS, PILOT_PN, PWR_COM_IND, FOR_FUND_CODE_CHAN, FOR_SUP_INCLUDED, FOR_SUP_CHAN_REC Record, FPC_SUBCHAN_GAIN, USE_PC_TIME, PC_ACTION_TIME, RLGAIN_TRAFFIC_PILOT, DEFAULT_RLAG, RECORD_TYPE, RECORD_LEN, RC_SYNC_ID_INCL, RC_SYNC_ID, BLOB_INCL and BLOB.

\* \* \* \* \*